(12) United States Patent
Takakura

(10) Patent No.: US 7,636,605 B2
(45) Date of Patent: Dec. 22, 2009

(54) MAGNETIC DISK DEVICE AND HEAD-POSITION CONTROL METHOD

(75) Inventor: Shinji Takakura, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 259 days.

(21) Appl. No.: 11/687,706

(22) Filed: Mar. 19, 2007

(65) Prior Publication Data
US 2007/0265714 A1 Nov. 15, 2007

(30) Foreign Application Priority Data
May 11, 2006 (JP) .............................. 2006-133042

(51) Int. Cl.
G05B 13/02 (2006.01)
G11B 5/596 (2006.01)
(52) U.S. Cl. ................... 700/45; 360/78.04; 360/78.06; 360/78.07; 360/78.09
(58) Field of Classification Search ............. 360/78.06, 360/78.04, 78.07, 78.09; 700/45
See application file for complete search history.

(56) References Cited

U.S. PATENT DOCUMENTS

| | | | | |
|---|---|---|---|---|
| 3,940,694 A | * | 2/1976 | Price et al. ................... | 708/277 |
| 5,229,896 A | * | 7/1993 | Tohyama et al. ......... | 360/78.07 |
| 6,279,108 B1 | * | 8/2001 | Squires et al. ............... | 712/244 |
| 6,961,205 B2 | * | 11/2005 | Atsumi et al. ............ | 360/78.06 |
| 7,457,076 B2 | * | 11/2008 | Semba et al. ............ | 360/78.06 |
| 2006/0114601 A1 | * | 6/2006 | Semba et al. ............ | 360/78.09 |

FOREIGN PATENT DOCUMENTS

JP         04-255973        9/1992

OTHER PUBLICATIONS

Lee et al., Design of a Robust Track-Following Controller for Optical Drives IEEE 2004, p. 723-731.*
Lee et al., "Head Posting Control System for Small-Sized Hard Disk Drives", IEEE 1996, p. 64-72.*
Japanese Office action mailed Sep. 30, 2008 corresponding to U.S. Appl. No. 11/687,706, filed Mar. 19, 2007.

* cited by examiner

*Primary Examiner*—Albert DeCady
*Assistant Examiner*—Thomas H Stevens
(74) *Attorney, Agent, or Firm*—Turocy & Watson, LLP

(57) ABSTRACT

A feedback controller performs a feedback control based on an error between a target position and an actual position of a head. A model controller obtains a control command, a model position to be output as a command for the target position to the feedback controller, and a model velocity for the head to follow a target velocity, by using a preset control equation model, and obtains the control command and the model position with the target position as an input, based on a differential value of the target velocity corresponding to a remaining distance from the model position to the target position.

12 Claims, 18 Drawing Sheets

MAGNETIC DISK DEVICE AND HEAD-POSITION CONTROL METHOD

CROSS-REFERENCE TO RELATED APPLICATIONS

This application is based upon and claims the benefit of priority from the prior Japanese Patent Application No. 2006-133042, filed on May 11, 2006; the entire contents of which are incorporated herein by reference.

BACKGROUND OF THE INVENTION

1. Field of the Invention

The present invention generally relates to a magnetic disk device including a positioning control mechanism for positioning a head at a target position on a magnetic disk, and a head-position control method.

2. Description of the Related Art

In a head-positioning control system for a magnetic disk device, a microcomputer is generally used to configure a digital control system. In the digital control system, a control command is calculated in the microprocessor from discretely obtained position information for a head, and the control command calculated is provided to a drive of an actuator through a digital-to-analog (D/A) converter.

The actuator generally has mechanical resonance in a high-frequency band, and therefore, to move the head to a target position on the magnetic disk at high velocity with low vibration and low noise, it is extremely important to generate a feedforward control input, which does not excite the mechanical resonance. To move the head only for a short distance at high velocity, a technique as follows can be considered. The technique is such that a feedforward control input for the actuator so as not to excite the mechanical resonance and a target position command for a feedback control system are previously calculated by using an optimization technique to be stored as a table on memory, and the feedforward control input for the actuator and the target position command for the feedback control system are determined by referring to the table upon positioning the head.

However, in the technique for head-positioning control, the feedforward control input to the actuator and the target position command to the feedback control system for all the seek distances need to be held in the table. Therefore, it is impossible to implement this technique because the memory capacity of the microprocessor is limited.

Consequently, if a long-distance seek is required, it is necessary to successively calculate the feedforward control input for the actuator and the target position command. For example, JP-A H9-073618 (KOKAI) discloses a technology of holding a model control system for an actuator in a positioning control system and causing a model velocity to follow a target velocity curve, to output a control command for the model control system and a model position, which are the feedforward control for the actuator and the target position command, to the feedback control system.

In such a conventional technology as above, the control command for the model control system and the model position are output, as the feedforward control input for the actuator and the target position command, to the feedback control system. Therefore, when a short-distance seek operation is required, the feedforward control input for the actuator and the target position command cannot previously be calculated by using the optimization technique. Thus, the configuration of the control system that causes the model velocity to follow the target velocity curve becomes particularly important.

In the conventional technology, however, for example, paragraph 0044 in JP-A H9-073618 (KOKAI) describes "a compensation element 35 is an element which multiplies a velocity error of a difference element 34 by a gain of a constant value K". As described above, because the model velocity is caused to follow the target velocity, only a simple velocity feedback control system is provided.

Therefore, when the target velocity is increased, the model velocity cannot follow the target velocity, overshoot thereby occurs at a model position.

Further, to improve the following capability of the model velocity to the target velocity, it can also be considered to set a velocity feedback gain to a high value. In this case, however, the velocity is abruptly switched to deceleration as soon as the model velocity reaches the target velocity, and a feedforward control command with abrupt switching from acceleration to deceleration is provided to the actuator. As a result, excitation of the mechanical resonance cannot be suppressed.

SUMMARY OF THE INVENTION

A magnetic disk device according to one aspect of the present invention includes a magnetic disk on which data is recorded; a head that performs recording and reproducing data with respect to the magnetic disk; a head driver that moves the head in a radial direction of the magnetic disk; and a positioning controller that issues a control command to the head driver to control the head to be located at a target position on the magnetic disk. The positioning controller includes a feedback controller that performs a feedback control based on an error between the target position and an actual position of the head; and a model controller that obtains the control command, a model position to be output as a command for the target position to the feedback controller, and a model velocity for the head to follow a target velocity, by using a preset control equation model, and obtains the control command and the model position with the target position as an input, based on a differential value of the target velocity corresponding to a remaining distance from the model position to the target position.

A method of controlling a head position on a magnetic disk, according to another aspect of the present invention, includes controlling a head that performs recording and reproducing data with respect to the magnetic disk to be located at a target position on the magnetic disk by performing a feedback control based on an error between the target position and an actual position of the head; and obtaining, when obtaining a control command issued to a head driver that moves the head in a radial direction of the magnetic disk, a model position to be output as a command for the target position for the feedback control, and a model velocity for the head to follow a target velocity, by using a preset control equation model, the control command and the model position with the target position as an input, based on a differential value of the target velocity corresponding to a remaining distance from the model position to the target position.

DETAILED DESCRIPTION OF THE INVENTION

Exemplary embodiments according to the present invention are explained in detail below with reference to the accompanying drawings. In the following embodiments, the magnetic disk device according to the present invention is applied to a hard disk drive (HDD).

Figure 1:
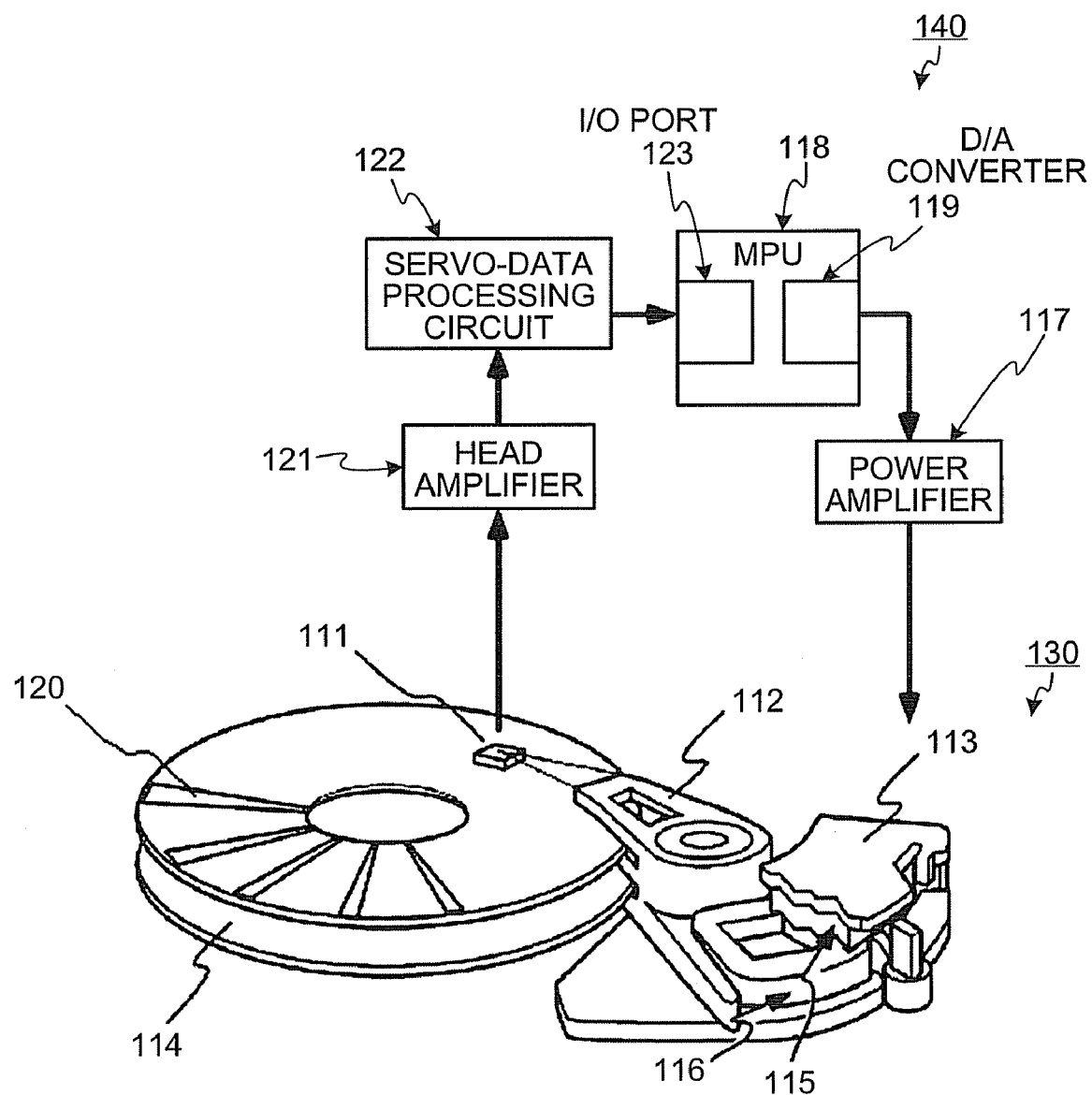
FIG. 1 is a schematic of a hard disk drive according to a first embodiment.

An HDD according to a first embodiment includes a hard disk (HD) 114, an actuator 130, and an HDD controller 140, as shown in FIG. 1. Specifically, the actuator 130 has mechanisms such as a magnetic head 111, an arm 112, and a voice coil motor (VCM) 113. The HDD controller 140 is provided as a control circuit having a head-positioning control mechanism on a printed board in the hard disk drive.

At least one of the HD 114 is provided for the HDD, and is rotated at high speed by a spindle motor. A plurality of tracks are concentrically formed on the HD 114, and each track has servo areas 120 formed at predetermined intervals. Track position information is previously embedded in each of the servo areas 120, and a data sector is provided between the servo areas 120 to record user data therein.

As shown in FIG. 1, the head 111 is held by the arm 112 in the actuator 130. The head 111 reads the track position information from the servo area 120, or reads the user data from the data sector. The arm 112 is made to pivot by the driving force of the VCM 113 to move the head 111 in the radial direction of the HD 114. The VCM 113 includes a magnet 115 and a driving coil 116, and is rotated by a drive current supplied from a power amplifier 117.

As shown in FIG. 1, the HDD controller 140 includes a microprocessor (MPU) 118 as a main component, a servo-data processing circuit 122, a head amplifier 121, and the power amplifier 117.

The head amplifier 121 amplifies a read signal corresponding to the track position information or the user data read from the head 111, and outputs the read signal to the MPU 118.

The MPU 118 includes a D/A converter 119 and an input-output (I/O) port 123. The MPU 118 executes various arithmetic processes for the head-positioning control system according to the first embodiment, and generates a control command to be provided to the VCM 113.

The power amplifier 117 converts the control command input from the MPU 118 to a drive current, and supplies the drive current to the VCM 113.

The head 111 reads a signal from the servo area 120, and the head amplifier 121 receives a read signal from the head 111 to amplify the read signal and supplies the read signal amplified to the servo-data processing circuit 122. The servo-data processing circuit 122 generates servo information from the read signal amplified and outputs the servo information to the MPU 118 at a predetermined time interval. The MPU 118 calculates a head position from the servo information input from the I/O port 123, and calculates a control command (feedforward control command u) provided to the VCM 113 at a predetermined time interval, from the head position obtained. The MPU 118 converts the control command calculated to an analog signal by the D/A converter 119, to be provided to the power amplifier 117. The power amplifier 117 converts the control command input from the MPU 118 to a drive current, and supplies the drive current to the VCM 113. The VCM 113 is thereby rotated, and the head 111 moves in the radial direction of the HD 114 according to the control command.

The head-positioning control system implemented by the MPU 118 is explained below. The head-positioning control system according to the first embodiment performs seek control to move (seek) the head 111 from a current position to a target position. If an access method of the HD 114 is based on sector unit, the target position mentioned here indicates a target track (cylinder) including its sector.

Figure 2:
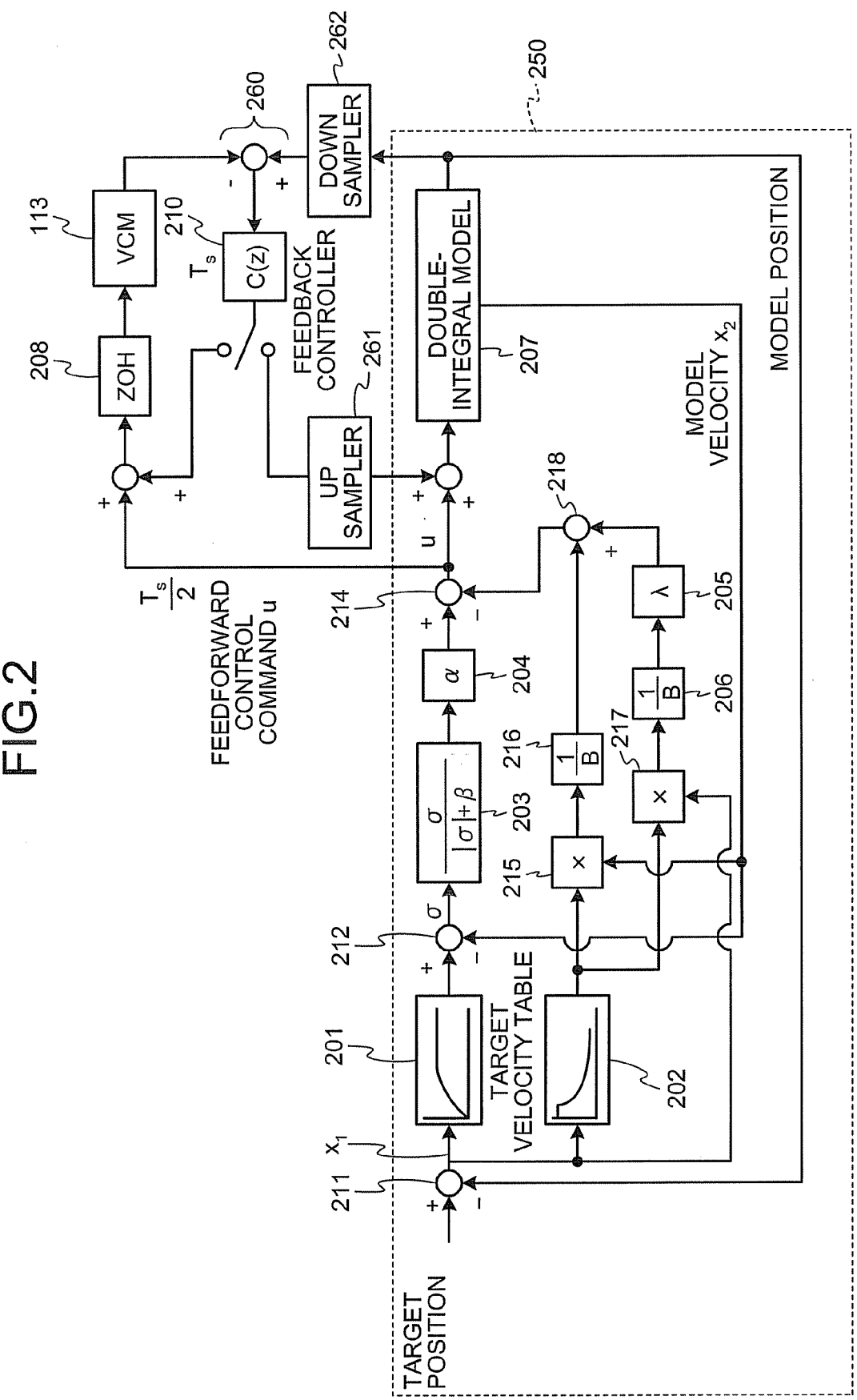
FIG. 2 is a control block diagram of a head-positioning control system according to the first embodiment.

The head-positioning control system according to the first embodiment includes two control loops such as a model-side control system 250 and a position-error feedback control system (C(z)) 260, as shown in FIG. 2.

The position-error feedback control system 260 is a control loop for performing feedback control based on an error between the target position of the head 111 and an actual position thereof.

The model-side control system 250 is a control loop for generating a feedforward control command u provided to the VCM 113, a model position as a target position command to be output to the position-error feedback control system 260, and a model velocity, by using a preset control Equation model, and for following the model velocity to the target velocity of the head 111.

To improve seek performance, it is important to provide a smooth feedforward control command to the VCM 113. Therefore, in the model-side control system 250, calculation is performed at a sampling frequency that is n times of that of the position-error feedback control system 260 by an up sampler 261 and a down sampler 262.

The position-error feedback control system 260 has observer mode and two-degree-of-freedom control mode upon seeking. In the first half of the seek operation, control is provided so that a switch is connected to the model-side control system 250 to be switched to the observer mode, an output signal of a feedback controller (C(z)) 210 is added into an input terminal of the model-side control system 250, and a model state (model position and model velocity) approaches the movement of the actuator 130. In the second half of the seek operation, the switch is connected to the VCM 113 to be switched to the two-degree-of-freedom control mode, and an output signal of the feedback controller (C(z)) 210 is input to the VCM 113. The control provided in the above manner allows the effect of current saturation and the effect of a position detection error upon seeking to be reduced. A ZOH 208 is a zero-order holder, which converts the output signal, being sampled, of the feedback controller (C(z)) 210 to a continuous-time signal, and outputs the signal converted to the VCM 113.

Figure 28:
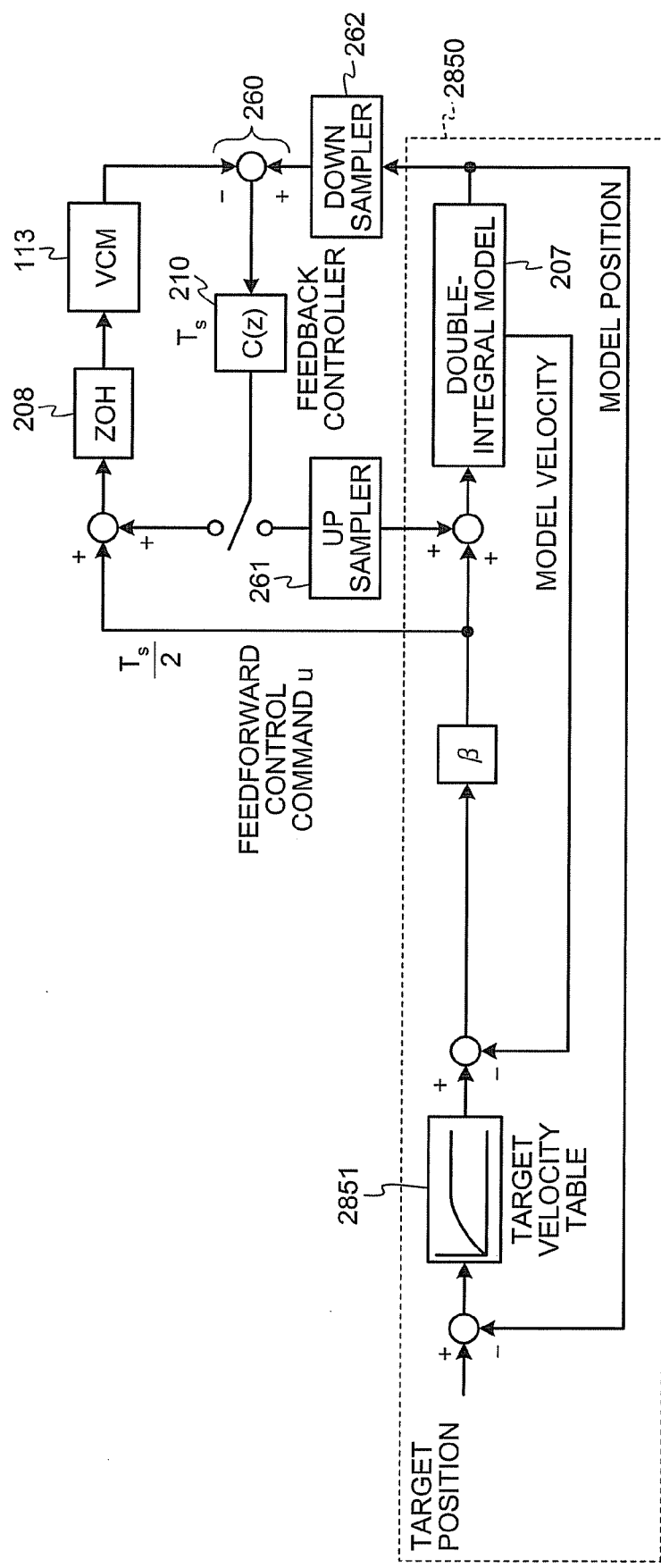
FIG. 28 is a control block diagram of the head-positioning control system according to the comparative example.

FIG. 28 is a control block diagram of a head-positioning control system according to the comparative example. The head-positioning control system according to the comparative example includes the position-error feedback control system 260, similarly to FIG. 2. A model-side control system 2850 has current saturation upon acceleration, and a constant feedback gain β is applied to a velocity error between the target velocity and the model velocity. A target-velocity table 2851 is a table in which a target velocity is previously associated with a difference between the target position and the model position, i.e., with a distance (remaining distance) from the model position to the target position, as target velocity curve.

In the head-positioning control system according to the comparative example, if the target velocity is increased to speed up seek velocity, the target velocity cannot be followed by the constant feedback gain control, which results in overshoot of the target position. To reduce an error of the model velocity to the target velocity, the constant feedback gain β of the velocity needs to be increased. However, if the constant feedback gain β is increased, the model velocity immediately changes to deceleration at the arrival thereof to the target velocity. Therefore, a control command (feedforward control to the actuator) to the model from acceleration to deceleration is abruptly changed. The feedforward control command with the abrupt change excites the mechanical resonance of the actuator, which causes residual vibration upon completion of seeking or noise during seeking. Therefore, in the first embodiment, the model-side control system 250 is configured to include a velocity control system in which the change of the control command from acceleration to deceleration is made smooth without sacrificing the following capability to the target velocity.

The principle of the model-side control system 250 in the head-positioning control system according to the first embodiment is explained below.

First, a state Equation of the model is expressed by Equation (1), where $x_1$ is a distance (remaining distance) of the model position to the target position, and $x_2$ is a model velocity.

$$\begin{bmatrix} \dot{x}_1 \\ \dot{x}_2 \end{bmatrix} = \begin{bmatrix} A_{11} & A_{12} \\ A_{21} & A_{22} \end{bmatrix} \begin{bmatrix} x_1 \\ x_2 \end{bmatrix} + \begin{bmatrix} 0 \\ B \end{bmatrix} u \qquad (1)$$

If the target velocity is represented by $f(x_1)$, a velocity error is σ is expressed by Equation (2).

$$\sigma = f(x_1) - x_2 \qquad (2)$$

When the model velocity follows the target velocity, the velocity error is σ=0, and Equation (3) thereby holds.

$$\frac{d\sigma}{dt} = \frac{df(x_1)}{dx_1} \frac{dx_1}{dt} - \frac{dx_2}{dt} = \frac{df(x_1)}{dx_1} \dot{x}_1 - \dot{x}_2 = 0 \qquad (3)$$

If Equation (3) is substituted into Equation (1), Equation (4) holds.

$$\begin{bmatrix} \frac{df(x_1)}{dx} - 1 \end{bmatrix} \begin{bmatrix} A_{11} & A_{12} \\ A_{21} & A_{22} \end{bmatrix} \begin{bmatrix} x_1 \\ x_2 \end{bmatrix} + \begin{bmatrix} \frac{df(x_1)}{dx_1} - 1 \end{bmatrix} \begin{bmatrix} 0 \\ B \end{bmatrix} u = 0 \qquad (4)$$

Because the actuator is represented by the second-order system and mechanical resonance, if a complete double integral is selected as a model, the parameters of Equation (1) are as shown in Equation (5).

$$A_{11}=0, A_{12}=-1, A_{21}=0, A_{22}=0, B>0 \qquad (5)$$

When the parameters in Equation (5) are substituted into Equation (4), a control input $U_{eq}$ required for following the target velocity is expressed by Equation (6).

$$u_{eq} = -\frac{1}{B} \cdot \frac{df(x_1)}{dx_1} \cdot x_2 \qquad (6)$$

Here, the physical meaning of Equation (6) is considered. Equation (6) can be modified to Equation (7).

$$u_{eq} = -\frac{1}{B} \cdot \frac{df(x_1)}{dx_1} \cdot x_2 = -\frac{1}{B} \cdot \frac{df(x_1)}{dx_1} \cdot \frac{dx_1}{dt} = -\frac{1}{B} \cdot \frac{df(x_1)}{dt} \qquad (7)$$

In other words, the control input $U_{eq}$ shown in Equation (6) represents acceleration feedforward. However, because the control input $U_{eq}$ is required for the following after the model velocity reaches the target velocity and does not include a term of the velocity error, the model velocity cannot be accelerated up to the target velocity. The output of the feedback controller 210 is added to the model-side control system 250 in the first half of the seek operation, and an error thereby occurs between the target velocity and the model velocity only by the control input in Equation (6). Therefore, a control input shown in Equation (8) is considered.

$$u = -\frac{1}{B} \cdot \frac{df(x_1)}{dx_1} \cdot x_2 + \alpha \frac{\sigma}{|\sigma| + \beta} \qquad (8)$$

The first term in Equation (8) is acceleration feedforward, and the second term is non-linear feedback of a velocity error, which form a two-degree-of-freedom control system. For the second term, when the velocity error is large, the amount of feedback is small, but the amount of feedback is larger as the velocity error is smaller. However, because the first term is decided from the model and the target velocity curve, the control input expressed by the Equation (8) has no freedom to adjust the way to reach the target velocity curve, but the way is decided by α and β of the second term. By making α smaller and making β larger, the way to reach the target velocity can be made smoother. At the same time, the output of the feedback controller 210 added in the first half of the seek operation also causes the following performance to the target velocity curve to be degraded. Therefore, in the first embodiment, the model-side control system 250 implementing Equation (9) is configured as shown in FIG. 2 allowing for the control input shown in Equation (9).

$$u = -\frac{1}{B} \cdot \frac{df(x_1)}{dx_1} \cdot x_2 + \alpha \frac{\sigma}{|\sigma|+\beta} - \lambda \cdot \frac{1}{B} \cdot \frac{df(x_1)}{dx_1} \cdot x_1 \qquad (9)$$

In Equation (9), the first term is a value based on a multiplied value obtained by multiplying a differential value of a target velocity corresponding to a remaining distance from the model position to the target position, by a model velocity. The second term is a value based on an error $\sigma$ between the model velocity and the target velocity. The third term is a value based on a value obtained by multiplying a multiplied value of the differential value of the target velocity corresponding to the remaining distance and the remaining distance, by a gain constant $\lambda$. The model-side control system 250 according to the first embodiment expressed by Equation (9) obtains a feedforward control command u from the values of these three terms.

More specifically, the feedforward control command u is calculated in the following manner. As shown in FIG. 2, when a target position is set to be input to the model-side control system 250, a difference element 211 obtains a remaining distance $x_1$ which is a difference between the target position and the model position which is calculated by a double-integral model 207. Then, a target velocity $f(x_1)$ corresponding to the remaining distance $x_1$ is obtained by referring to the target velocity curve in a target-velocity table 201. The target-velocity table 201 is a table in which the target velocity $f(x_1)$ and the remaining distance $x_1$ are previously associated with each other as a target velocity curve, and is previously stored in a storage unit such as a memory in the MPU 118.

Then, a difference element 212 calculates a velocity error $\sigma$ that is a difference between the target velocity $f(x_1)$ obtained and the model velocity $x_2$ calculated by the double-integral model 207. The velocity error $\sigma$ is calculated in compensation elements 203 and 204 respectively, and the value of the second term in Equation (9) is output from the compensation element 204.

On the other hand, the target position is input to the model-side control system 250, and a differential value $df(x_1)/dx_1$ with the remaining distance $x_1$ of the target velocity $f(x_1)$ corresponding to the remaining distance $x_1$ is obtained by referring to a differential-value table 202. The differential-value table 202 is a table in which the remaining distance $x_1$ and a differential value $df(x_1)/dx_1$ with the remaining distance $x_1$ of the target velocity $f(x_1)$ are associated with each other, and is stored in the storage unit such as the memory in the MPU 118. In the first embodiment, the differential value $df(x_1)/dx_1$ with the remaining distance $x_1$ of the target velocity $f(x_1)$ is obtained by referring to the differential-value table 202, but the value is not limited thereby. For example, if the MPU 118 has high throughput, the differential value may be obtained by differentiating the target velocity $f(x_1)$ obtained from the target-velocity table 201.

The differential value $df(x_1)/dx_1$ is multiplied by the model velocity $x_2$ calculated by the double-integral model 207 in a multiplier 215, the value multiplied is multiplied by 1/B in a compensation element 216, and the value of the first term in Equation (9) is output from the compensation element 216.

Furthermore, the differential value $df(x_1)/dx_1$ is multiplied by the remaining distance $x_1$ in a multiplier 217, the value multiplied is multiplied by 1/B in a compensation element 206, and further multiplied by a gain $\lambda$ in a compensation element 205, and the value of the third term in Equation (9) is output from the compensation element 205.

The values of the first term, the second term, and the third term in Equation (9) calculated in the above manner are added and subtracted by an addition element 218 and a difference element 214 respectively, to obtain the control command u. The control command u is input to the double-integral model 207 and is provided as the feedforward control command u to the actuator.

The double-integral model 207 receives the control command u and calculates the model velocity $x_2$ and the model position. The model position is output as a target position command to the position-error feedback control system.

In the first embodiment, to make smoother the change of the control command from acceleration to deceleration, it is focused on the fact that the model velocity $x_2$ is simply set to reach smoothly the target velocity. Then, the model-side control system is configured by using the differential value $df(x_1)/dx_1$ of the target velocity with respect to the remaining distance $x_1$, to generate the feedforward control command u required for the model velocity $x_2$ following the target velocity, by using the remaining distance $x_1$ corresponding to the target velocity. With this generation, there is no need to increase the gain $\lambda$ more than necessary, and the model velocity $x_2$ can smoothly reach the target velocity.

In Equation (9), the second term and the third term are dominant before the model velocity reaches the target velocity, and the model velocity is caused to reach the target velocity curve mainly by the second term and the third term. After reaching the target velocity curve, the first term and the second term become dominant. In this case, $\alpha$ and $\beta$ are determined from the following performance of the model velocity to the target velocity curve, and how the model velocity reaches the target velocity curve is adjusted by the gain $\lambda$. An increase in the gain $\lambda$ allows the model velocity to smoothly reach the target velocity curve, and the change from acceleration to deceleration can thereby be made smoother. Therefore, in the first embodiment, the gain $\lambda$ is controlled to be changeable.

However, a smooth way to reach the target velocity curve causes a seek time to increase. Therefore, there is a trade-off between the magnitude of $\lambda$ and the seek time.

Next, consideration is made for the condition in which the model-side control system becomes stable upon using the control input shown in Equation (9).

Equation (10) with the velocity error $\sigma$ is defined, where V is Lyapunov function.

$$V = \frac{1}{2} \cdot \sigma^2 \qquad (10)$$

When the Lyapunov function V approaches 0, the feedback control system becomes stable. Differential of V is expressed by Equation (11).

$$\dot{V} = \sigma \cdot \dot{\sigma} = \sigma\left(\frac{df(x_1)}{dx_1}\dot{x}_1 - \dot{x}_2\right) = \left(-\frac{df(x_1)}{dx_1}x_2 - B \cdot u\right) \qquad (11)$$

The control input u shown in Equation (9) is added to Equation (11), and Equation (12) is obtained as follows.

$$\dot{V} = \sigma\left(-\frac{df(x_1)}{dx_1}x_2 + \frac{df(x_1)}{dx_1}x_2 + \lambda \cdot \frac{df(x_1)}{dx_1} \cdot x_1 - \alpha \cdot B \cdot \frac{\sigma}{|\sigma|+\beta}\right) \quad (12)$$

$$= \sigma \cdot \lambda \cdot \frac{df(x_1)}{dx_1}x_1 - \alpha \cdot B \cdot \frac{\sigma^2}{|\sigma|+\beta}$$

When Equation (12) is negative, the Lyapunov function V approaches 0. Therefore, the case is considered by being separated into the following four cases, where $df(x_1)/dx_1 > 0$, $\beta$ is sufficiently smaller as compared with $|\sigma|$, and r is a moving distance.

First, if $\sigma < 0$ and $x_1 < 0$, Equation (13) holds. Hence, Equation (14) is only necessary to hold.

$$\sigma \cdot \lambda \cdot \frac{df(x_1)}{dx_1}x_1 > 0, \ \alpha \cdot B \cdot \frac{\sigma^2}{|\sigma|+\beta} > 0 \quad (13)$$

$$\sigma \cdot \lambda \cdot \frac{df(x_1)}{dx_1}x_1 < \alpha \cdot B \cdot \frac{\sigma^2}{|\sigma|+\beta} \cong \alpha \cdot \beta \cdot \frac{\sigma^2}{|\sigma|} = -\alpha \cdot B \cdot \sigma \quad (14)$$

Equation (15) is obtained from Equation (14), and Equation (16) holds.

$$-\sigma \cdot \lambda \cdot \frac{df(x_1)}{dx_1}|x_1| < -\alpha \cdot B \cdot \sigma \quad (15)$$

$$\lambda \cdot \frac{df(x_1)}{dx_1}|x_1| < \lambda \cdot \frac{df(x_1)}{dx_1}|r| < \alpha \cdot B \quad (16)$$

From the above, if $\sigma < 0$ and $x_1 < 0$, and when the gain $\lambda$ is selected so as to satisfy the condition of Equation (17), Equation (12) is negative, the Lyapunov function V approaches 0, and the model-side control system 250 is stabled.

$$\lambda < \frac{\alpha \cdot B}{\left(\frac{df(x_1)}{dx_1}\right)_{max}|r|} < \frac{\alpha \cdot B}{\frac{df(x_1)}{dx_1}|r|} \quad (17)$$

The target velocity curve is generally expressed by Equation such as Equation (18). Therefore, the maximum value of $df(x_1)/dx_1$ is a slope $R_1$ when the remaining distance is small, i.e., a constant value, as shown in Equation (19).

$$\begin{cases} x_1 \leq R, \ f(x_1) = R_1 \cdot x_1 \\ x_1 > R, \ f(x) = R_2 \cdot \sqrt{(x_1 - R)} - R_3 \end{cases} \quad (18)$$

$$\left(\frac{df(x_1)}{dx_1}\right)_{max} = R1 \quad (19)$$

If $\sigma < 0$ and $x1 \geq 0$, Equation (12) is always negative. Therefore, in this case, the model-side control system 250 is always stabled.

Then, if $\sigma \geq 0$ and $x_1 < 0$, Equation (12) is always negative. Therefore, in this case, the model-side control system 250 is always stabled.

If $\sigma \geq 0$ and $x_1 \geq 0$, Equation (20) holds. Therefore, if Equation (21) is satisfied, Equation (12) is negative.

$$\sigma \cdot \lambda \cdot \frac{df(x_1)}{dx_1}x_1 > 0, \ \alpha \cdot B \cdot \frac{\sigma^2}{|\sigma|+\beta} > 0 \quad (20)$$

$$\sigma \cdot \lambda \cdot \frac{df(x_1)}{dx_1}x_1 < \alpha \cdot B \cdot \frac{\sigma^2}{|\sigma|+\beta} \cong \alpha \cdot \beta \cdot \frac{\sigma^2}{|\sigma|} = \alpha \cdot B \cdot \sigma \quad (21)$$

Equation (22) is obtained from Equation (21), and Equation (23) holds.

$$\sigma \cdot \lambda \cdot \frac{df(x_1)}{dx_1}x_1 < \alpha \cdot B \cdot \sigma \quad (22)$$

$$\lambda \cdot \frac{df(x_1)}{dx_1}|x_1| < \lambda \cdot \frac{df(x_1)}{dx_1}|r| < \alpha \cdot B \quad (23)$$

From the above, if $\sigma \geq 0$ and $x_1 \geq 0$, and when the gain $\lambda$ is selected so as to satisfy the condition of Equation (24), Equation (12) is negative, the Lyapunov function V approaches 0, and the model-side control system 250 is thereby stabled.

$$\lambda < \frac{\alpha \cdot B}{\left(\frac{df(x_1)}{dx_1}\right)_{max}|r|} < \frac{\alpha \cdot B}{\frac{df(x_1)}{dx_1}|r|} \quad (24)$$

From Equation (17) and Equation (23), the first embodiment is configured to set the gain $\lambda$ to satisfy the condition of Equation (25), and the model-side control system 250 is stabled by the control command shown in Equation (9).

$$\lambda < \frac{\alpha \cdot B}{\left(\frac{df(x_1)}{dx_1}\right)_{max}|r|} \quad (25)$$

Figure 3:
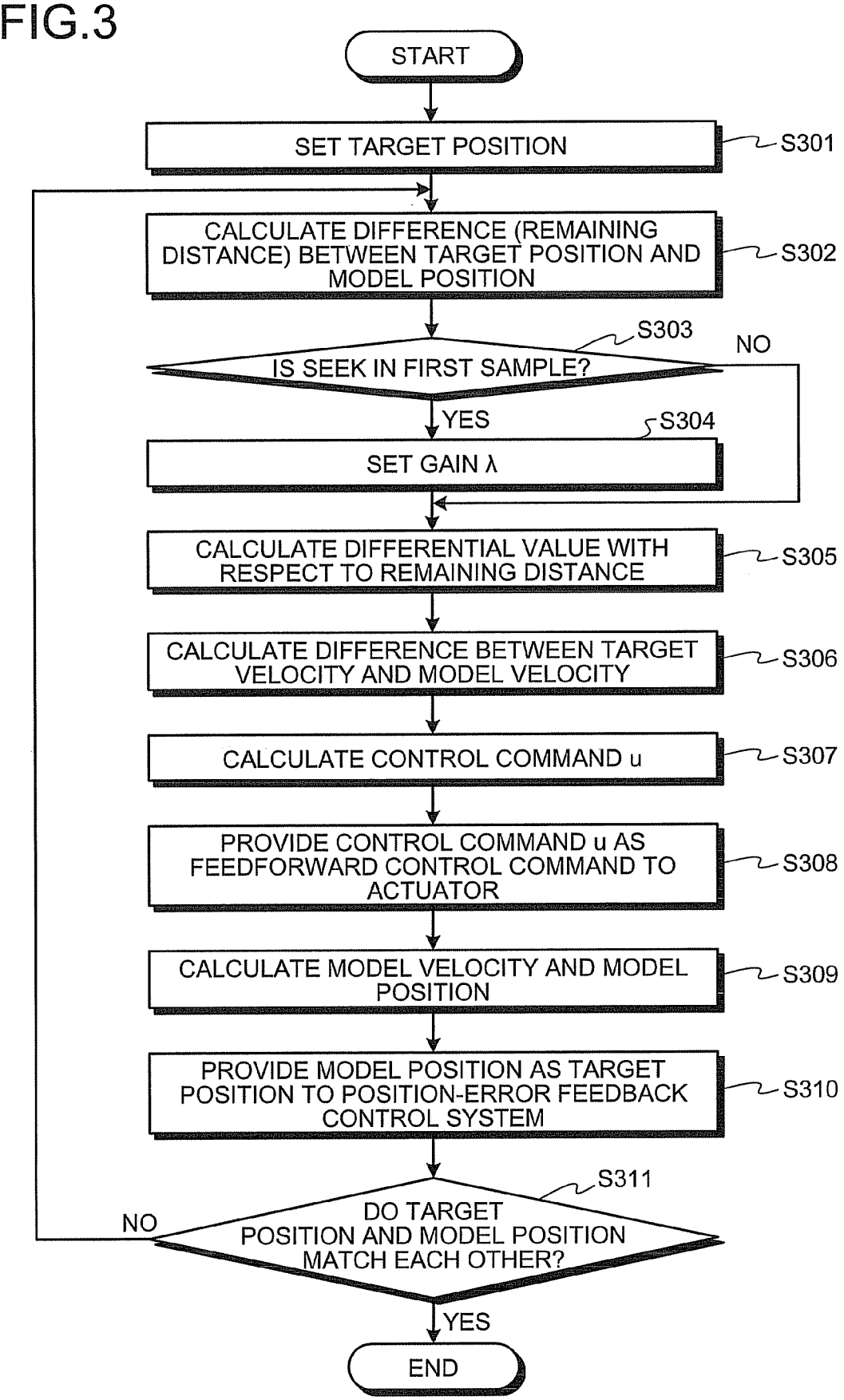
FIG. 3 is a flowchart of the procedure for a head-positioning control process according to the first embodiment.

The head-positioning control process according to the first embodiment configured in the above manner is explained below, with reference to FIG. 3.

First, a target position is set in the model-side control system 250 (step S301), and the model-side control system 250 calculates a remaining distance from a difference between the model position and the target position (step S302). Then, it is determined whether the seek operation is in a first sample (step S303). If it is in the first sample (Yes at step S303), then the gain $\lambda$ is set within a range of Equation (25) (step S304). If the seek operation is in a second sample and thereafter (No at step S303), the gain $\lambda$ is not set.

By referring to the target velocity curve of the target-velocity table, the target velocity is obtained from the remaining distance, and a differential value of the target velocity with respect to the remaining distance is further obtained by referring to the differential-value table (step S305). Then, a difference between the target velocity and the model velocity is calculated (step S306). And a control command for the double-integral model 207 is obtained from the model velocity, the model position, the target velocity, and the differential value of the target velocity with respect to the remaining distance, according to Equation (9) (step S307). Further, the control command u for the double-integral model 207 is provided as a feedforward control command u to the actuator (step S308).

The double-integral model 207 calculates a model position and a model velocity from the control command u input (step S309), and provides the model position as a target position command to the position-error feedback control system 260 (step S310). With these processes, the position-error feedback control system 260 performs position-error feedback control based on the model position as the target position command and the current actual position of the head 111, and performs seek control of the head 111.

On the other hand, the model-side control system 250 determines whether the model position and the target position match each other (step S311). If both the positions match, the process by the model-side control system 250 is finished. If both the positions do not match, the processes from steps S302 to S310 are repeatedly executed.

The effectiveness of the head-positioning control by the hard disk drive (HDD) according to the first embodiment is explained below by using the results of calculations and the results of experiments.

Figure 4:
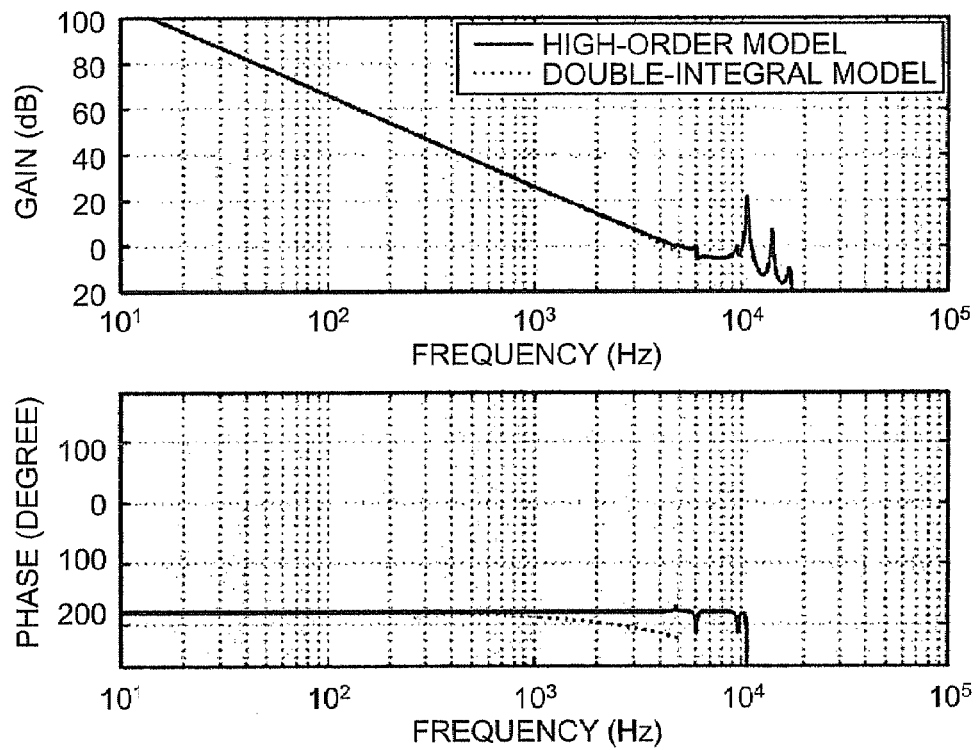
FIG. 4 is graphs of frequency characteristics of a control model for an actuator used for simulation and frequency characteristics of a double-integral model used for a model-side control system.

Frequency characteristics of a control model for the actuator used for simulation and frequency characteristics of the double-integral model used for the model-side control system are shown in FIG. 4. In the example, modeling of the actuator for 2.5-inch size HDD is used. As shown in FIG. 4, the actuator has mechanical resonance mainly at near 10.6 kHz and near 14 kHz. The sampling period in which a position error is read is 10.08 kHz, and in the model-side control system, calculation is performed at a period (20.16 kHz) as twice as the sampling period. In the method according to the comparative example, the results of simulations for the model upon ⅓-track seeking are shown in FIG. 5 to FIG. 8.

Figure 5:
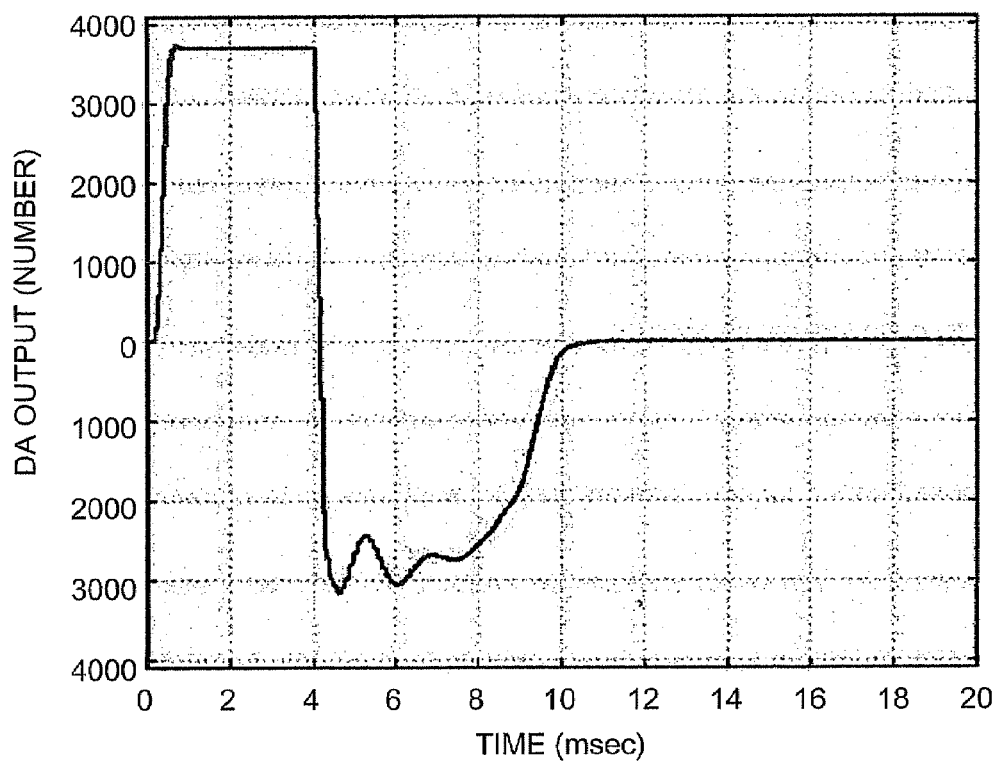
FIGS. 5 to 8 are graphs of the result of simulation upon ⅓-track seeking in a method according to a comparative example.
Figure 6:
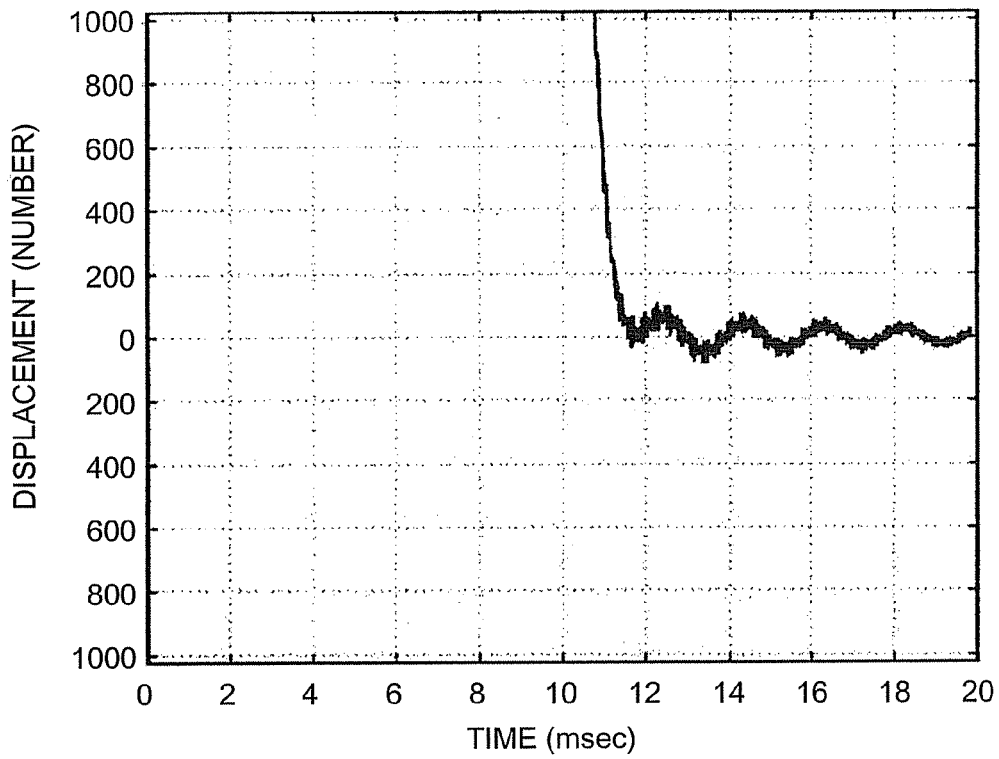
Figure 7:
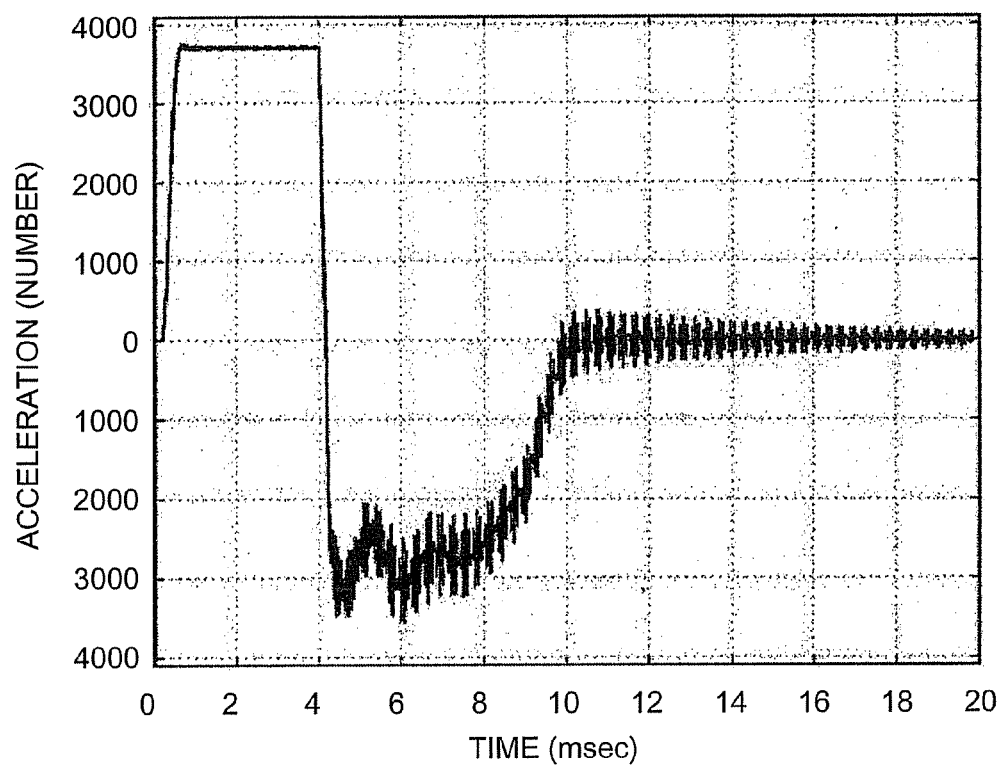
Figure 8:
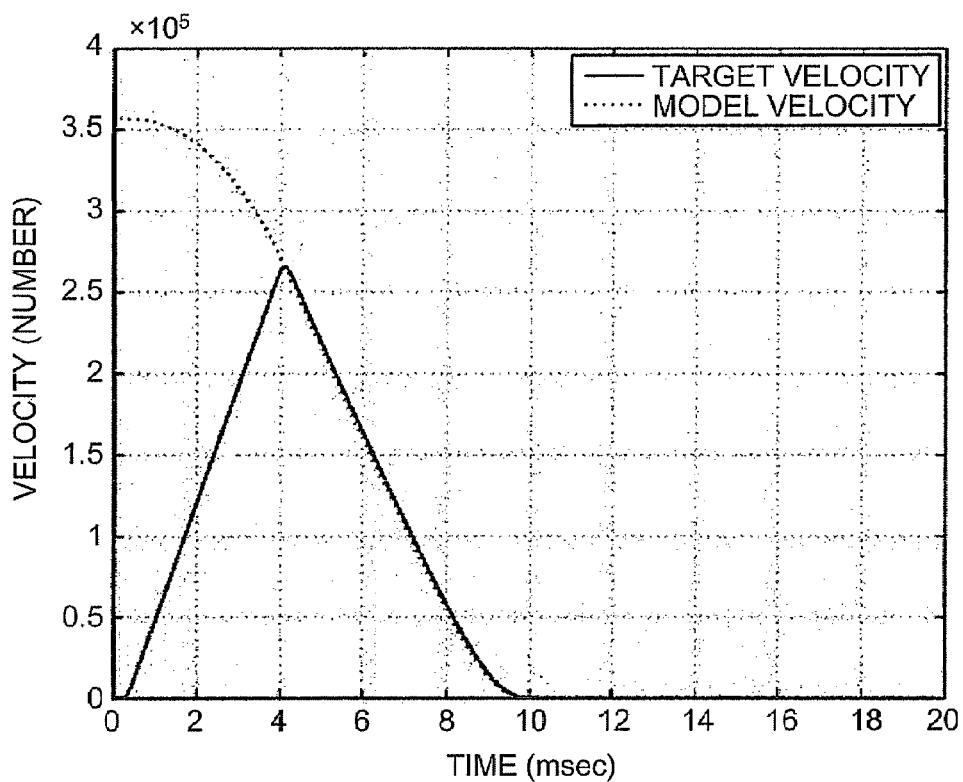

As shown in FIG. 5, switching to deceleration of the control command to the actuator is steep. Therefore, as shown in FIG. 6, it is found that there is residual vibration at the position of the actuator including a response time between sample points. It is also found from the second-order differential at the position of the actuator shown in FIG. 7 that mechanical resonance is excited upon switching to deceleration. From this, when the head-positioning control is performed by using the method according to the comparative example, it can be considered that noise upon seeking is large. Furthermore, the following capability of the model velocity to the target velocity has an error with respect to the target velocity as shown in FIG. 8. Therefore, it is obvious that the model velocity cannot follow the high target velocity by the head-positioning control in the method according to the comparative example.

Figure 9:
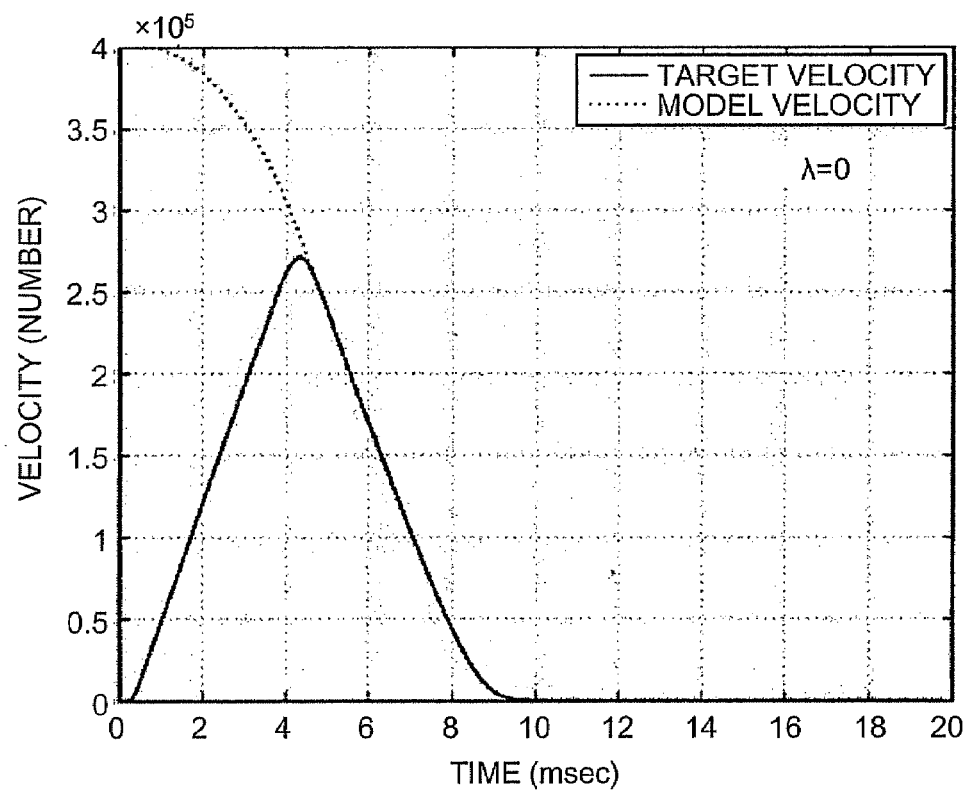
FIG. 9 is a graph of the following performance of a model velocity to a target velocity curve when a control command u calculated by Equation (8) is used.

The result of simulation for the control model of the same actuator when the head-positioning control system according to the first embodiment of FIG. 2 is used is explained below. As following performance of the model velocity to the target velocity curve when the control command u calculated by Equation (8) is used, as shown in FIG. 9, it is clear that the following performance to the target velocity is improved when the control command in Equation (8) is used, as compared with the method according to the comparative example. However, if the target velocity curve is provided, the differential of the target velocity with respect to the remaining distance is determined. Therefore, to control how the model velocity reaches the target velocity, α and β need to be changed. However, if α and β are changed and the way to reach is thereby changed, then this change affects on the following performance to the target velocity. Therefore, the control command shown in Equation (9) is used.

Figure 10:
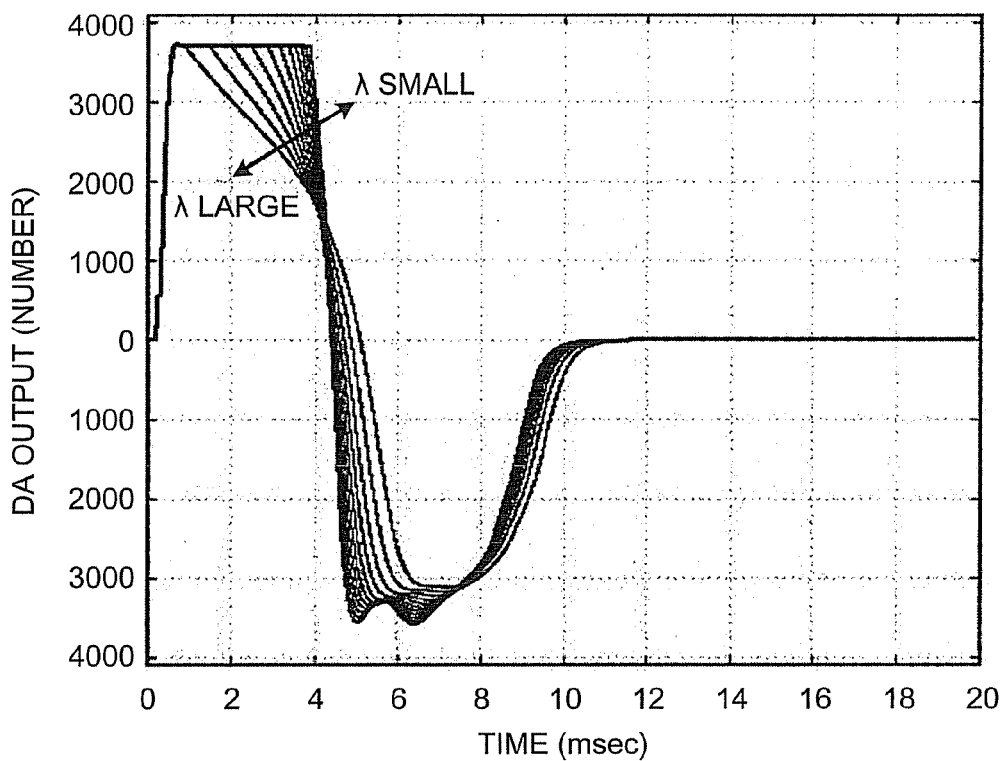
FIG. 10 is a graph of a state of the control command to the actuator when a gain λ is changed in Equation (9)
Figure 11:
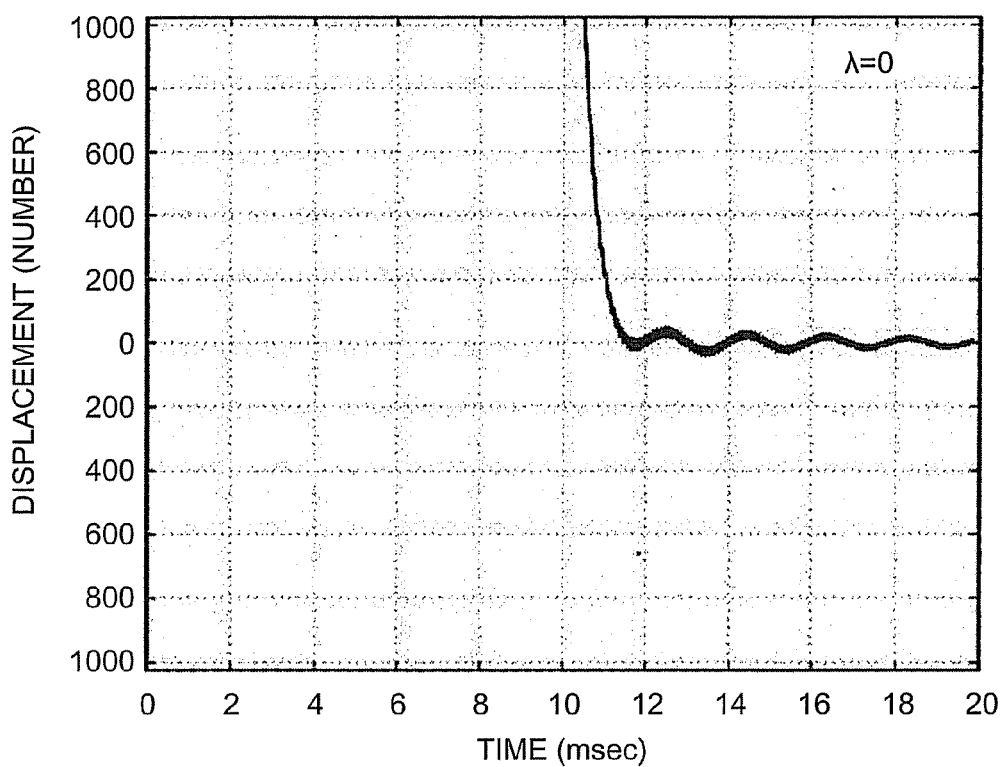
FIGS. 11 to 14 are graphs of a state at the position of the actuator when the control command in Equation (9) is used.
Figure 12:
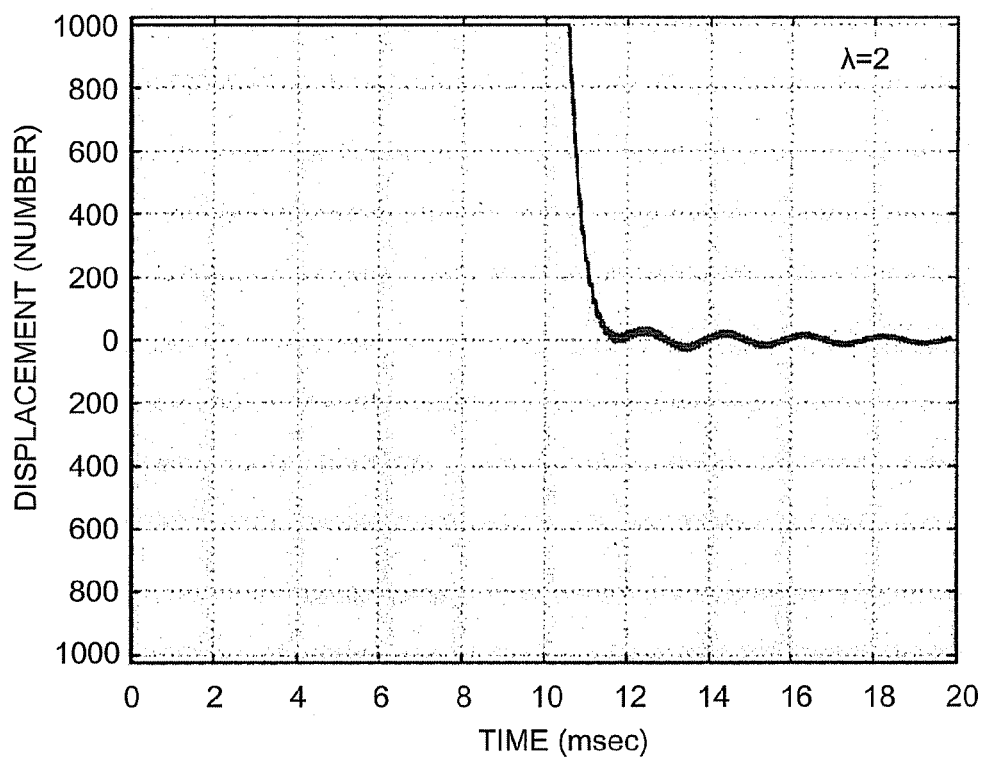
Figure 13:
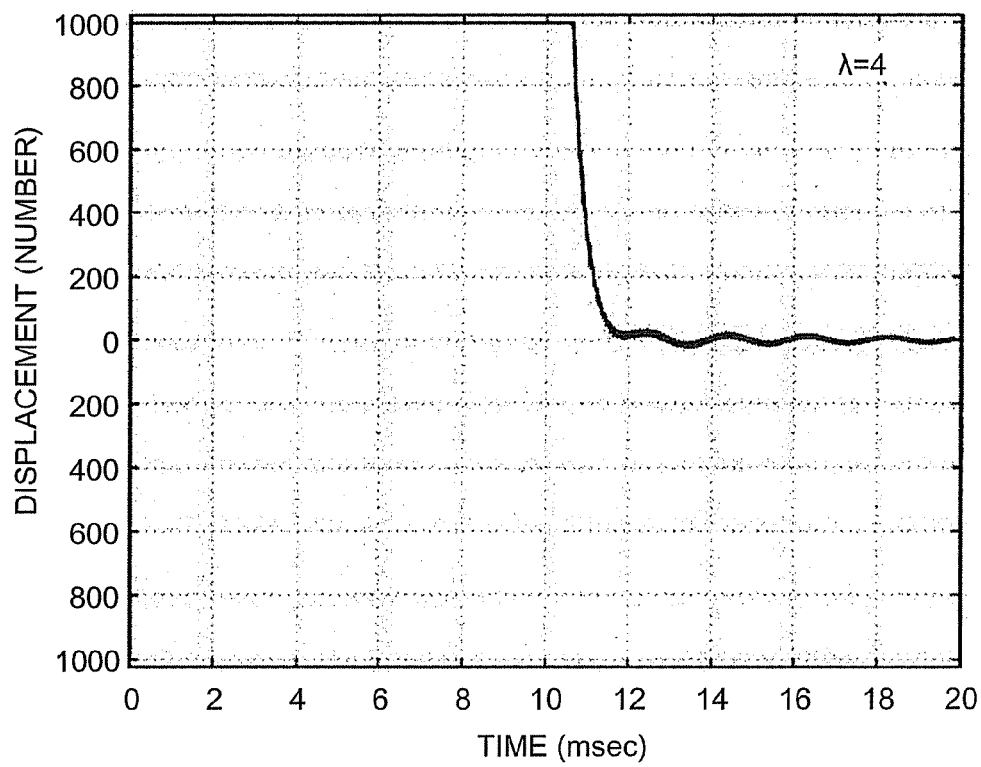
Figure 14:
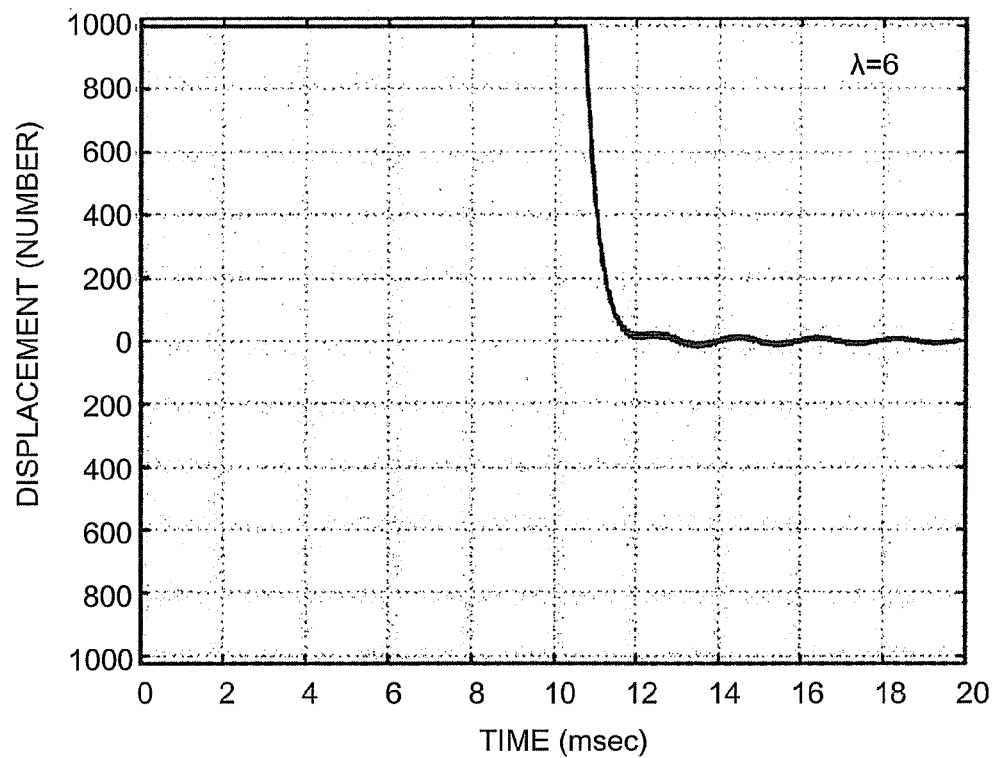

When the gain λ is changed in Equation (9), a state of the control command to the actuator is shown in FIG. 10. When the control command in Equation (9) is used, each state at the position of the actuator is shown in FIG. 11 showing the case where λ=0, FIG. 12: λ=2, FIG. 13: λ=4, and FIG. 14: λ=6.

Figure 15:
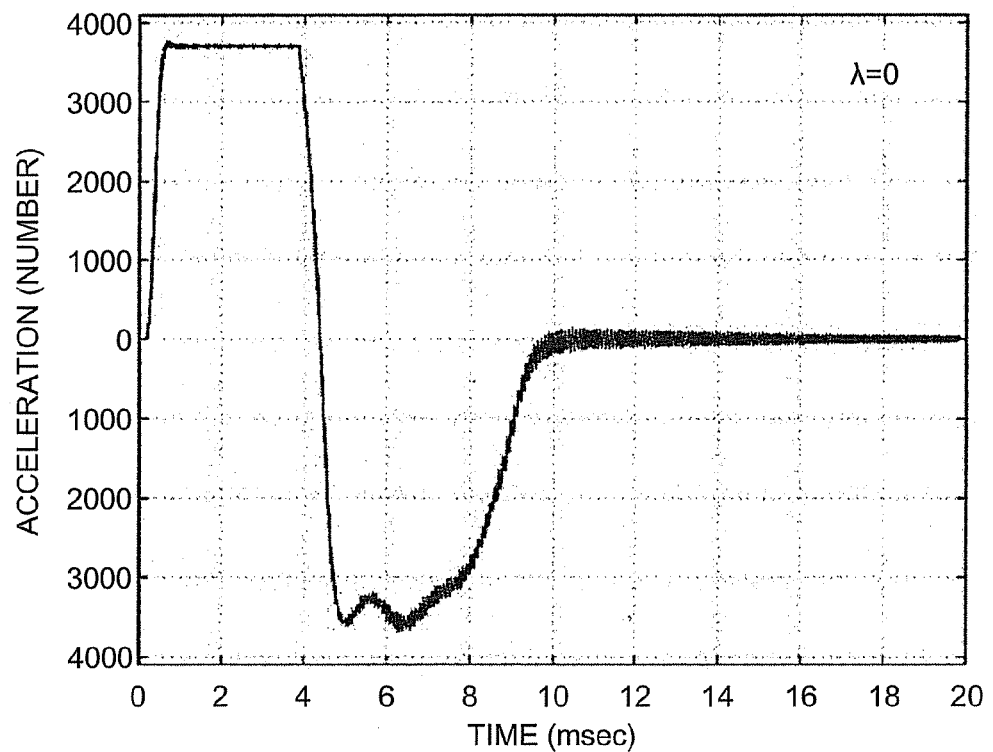
FIGS. 15 to 18 are graphs of a second-order differential at the position of the actuator when the control command in Equation (9) is used.
Figure 16:
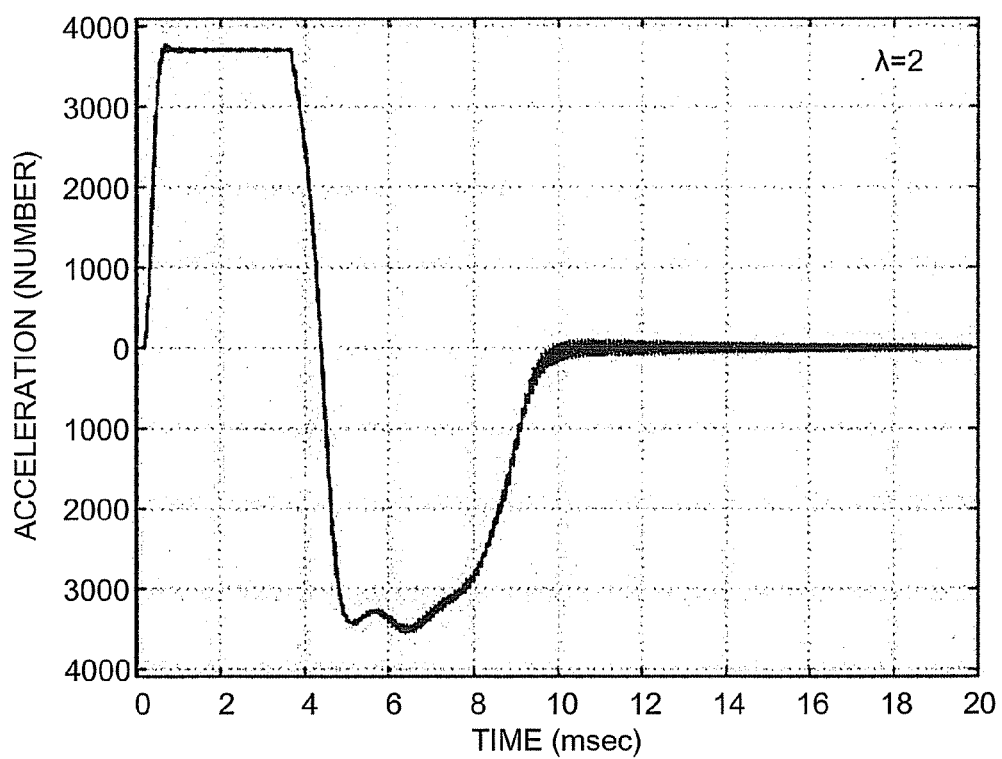
Figure 17:
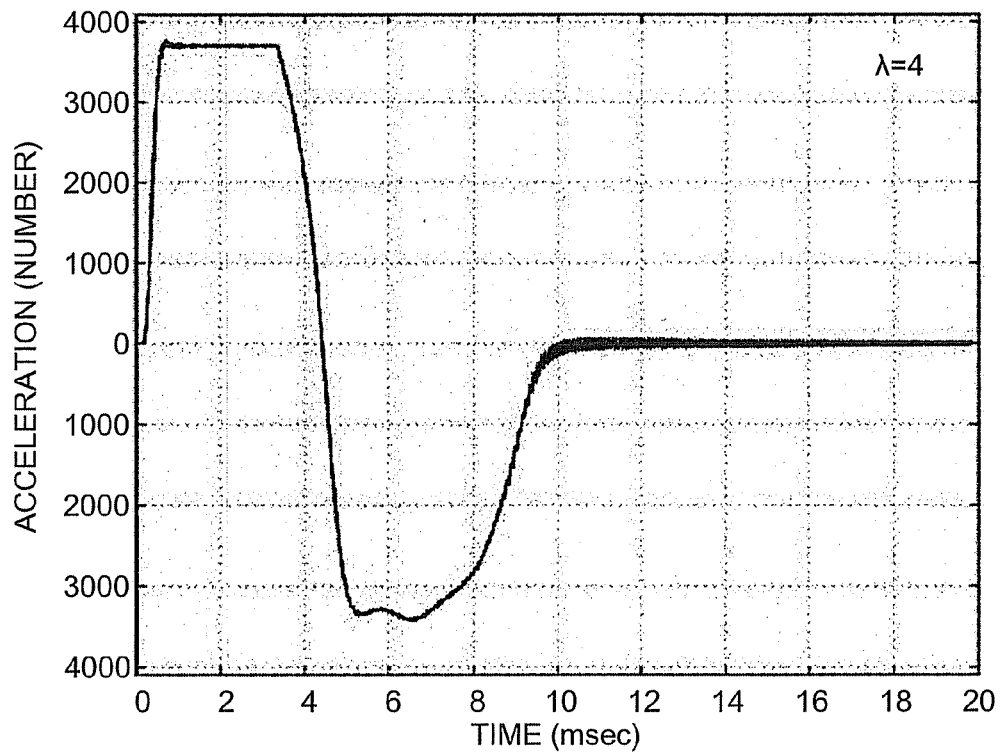
Figure 18:
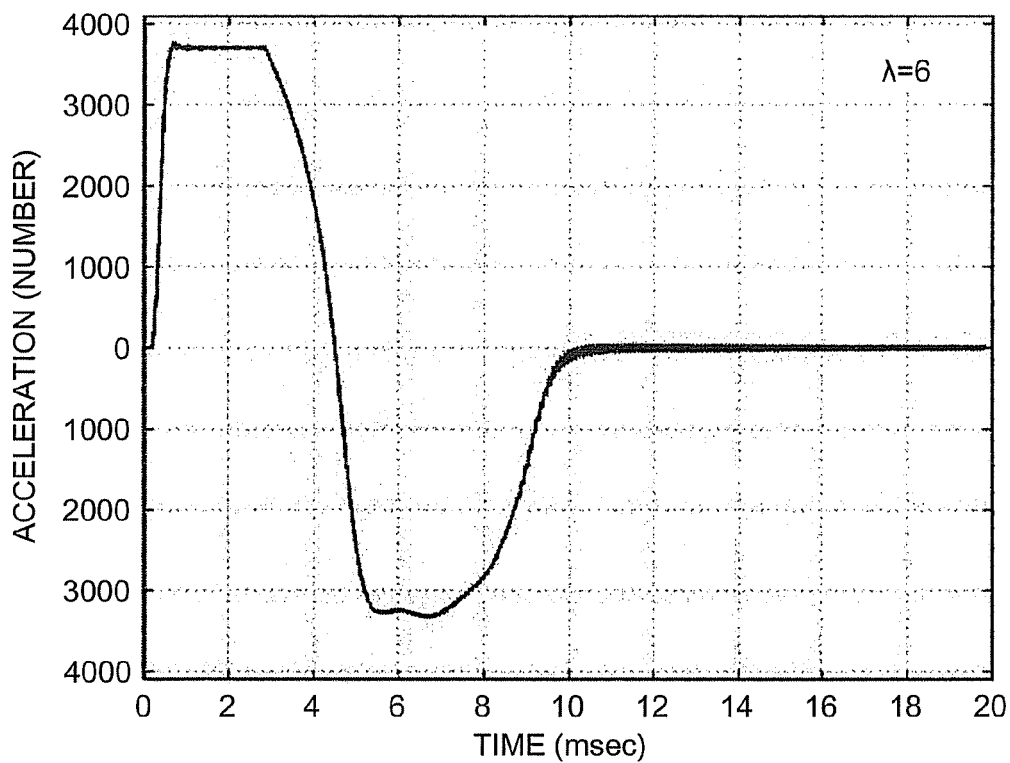

It is clear that, as shown in FIG. 10, the increase in the gain λ allows smooth change in acceleration and deceleration of the control command, and that residual vibration upon settling of the actuator is decreased as shown in FIG. 11 to FIG. 14. The second-order differentials at the positions of the actuator at its settling time are shown in FIG. 15 showing the case where λ=0, FIG. 16: λ=2, FIG. 17: λ=4, and FIG. 18: λ=6.

As is clear from FIG. 15 to FIG. 18, the change of the control command to deceleration can be made smoother. Therefore, it is obvious that the excitation of the mechanical resonance upon deceleration is suppressed as compared with the method according to the comparative example. From these facts, low noise upon seeking can be expected.

Figure 19:
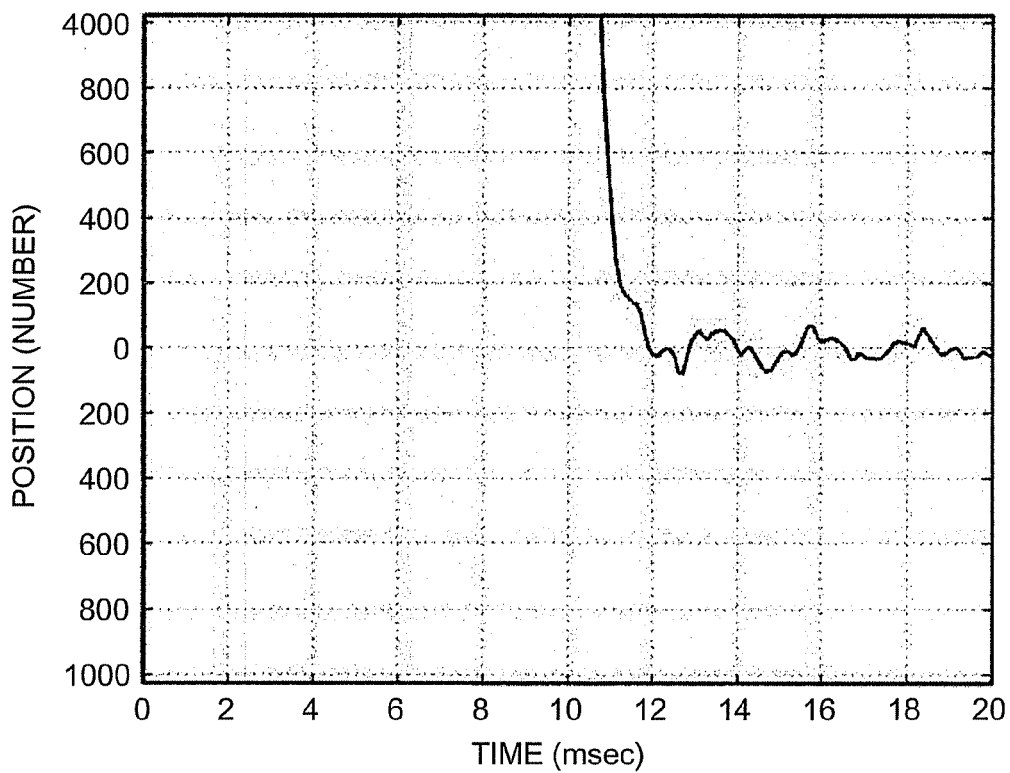
FIG. 19 is a graph of a settling waveform by a head-positioning control system according to the comparative example.

Measurement was conducted on settling waveform and noise upon ⅓-track seeking by implementing the control system proposed in a 2.5-inch size HDD and by using the head-positioning control according to the first embodiment and the head-positioning control according to the method in the comparative example. As shown in FIG. 19 depicting settling waveform by the head-positioning control system according to the comparative example, it is clear that residual vibration due to mechanical resonance of the actuator appears, similarly to the result of simulation.

Figure 20:
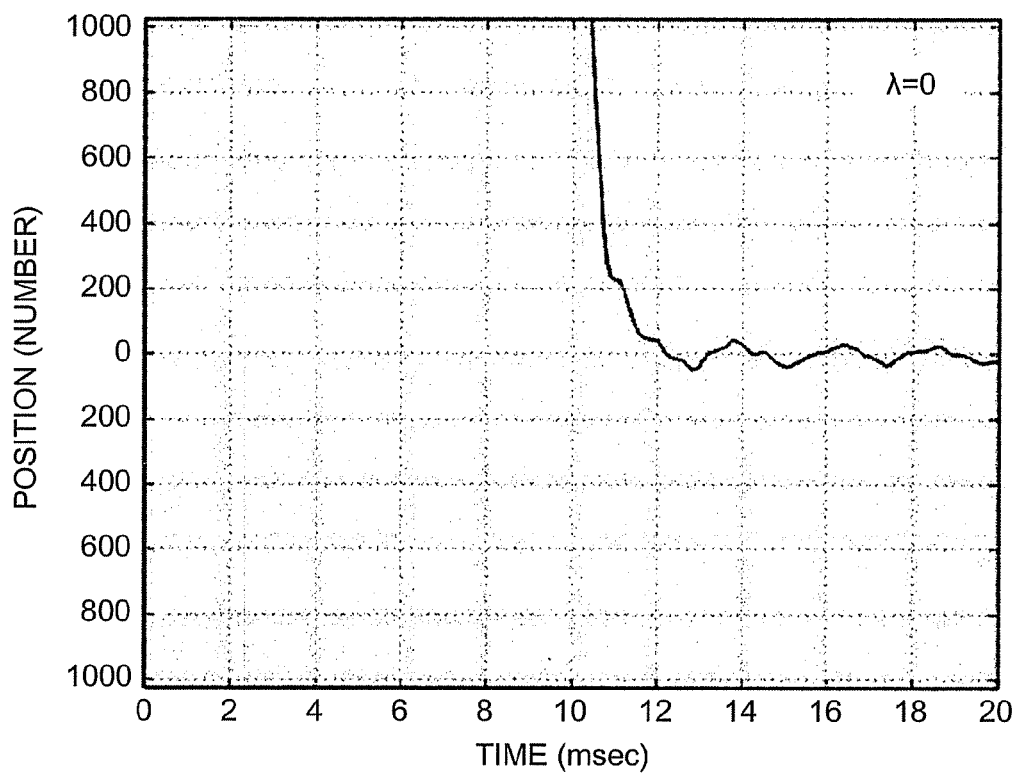
FIGS. 20 to 23 are graphs of a settling waveform by the head-positioning control system according to the first embodiment.
Figure 21:
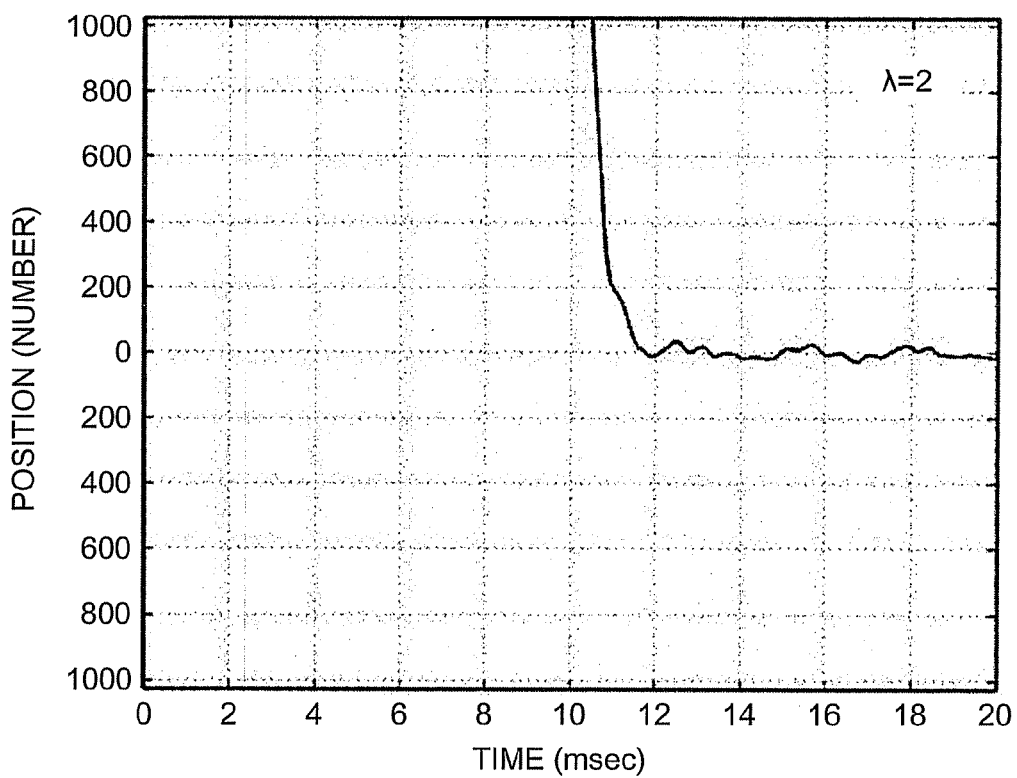
Figure 22:
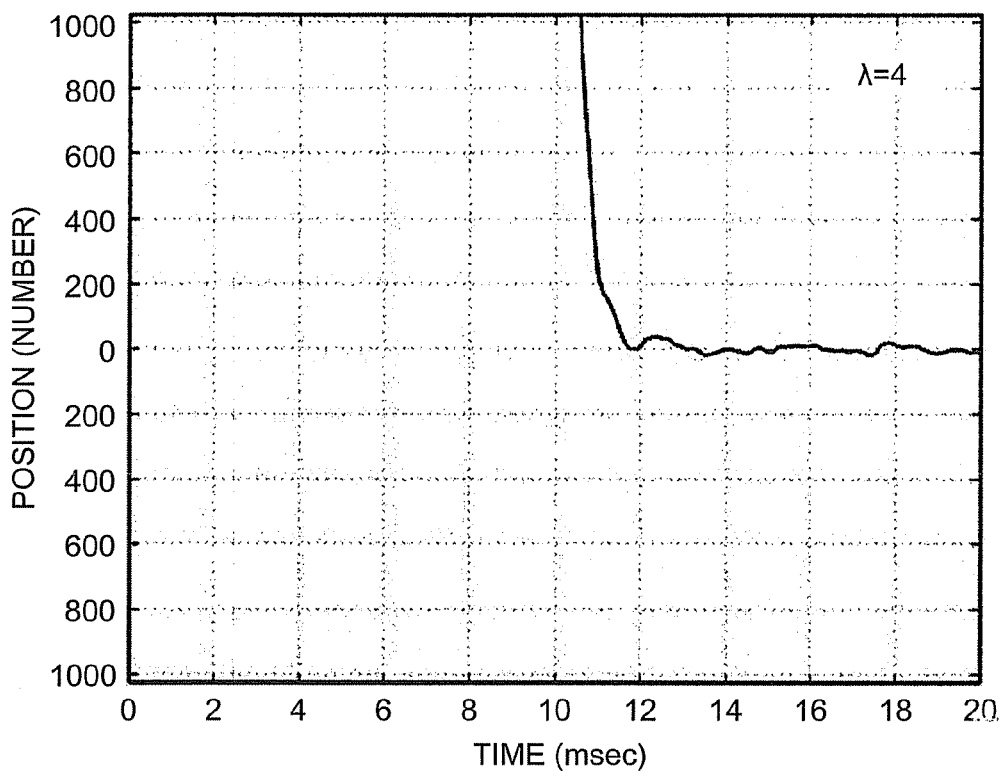
Figure 23:
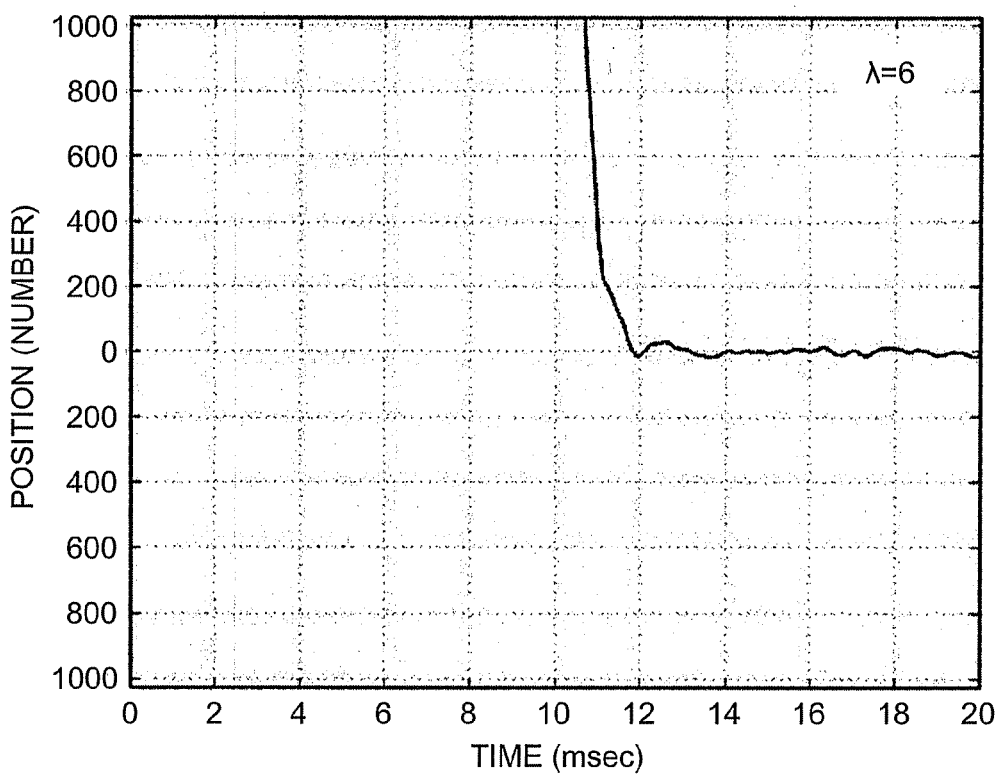

Settling waveforms by the head-positioning control system according to the first embodiment are shown in FIG. 20 showing the case where λ=0, FIG. 21: λ=2, FIG. 22: λ=4, and FIG. 23: λ=6. It is obvious from the settling waveforms shown in FIG. 20 to FIG. 23, that the increase in the gain λ allows suppression of the residual vibration due to mechanical resonance, similarly to the result of simulation.

Figure 24:
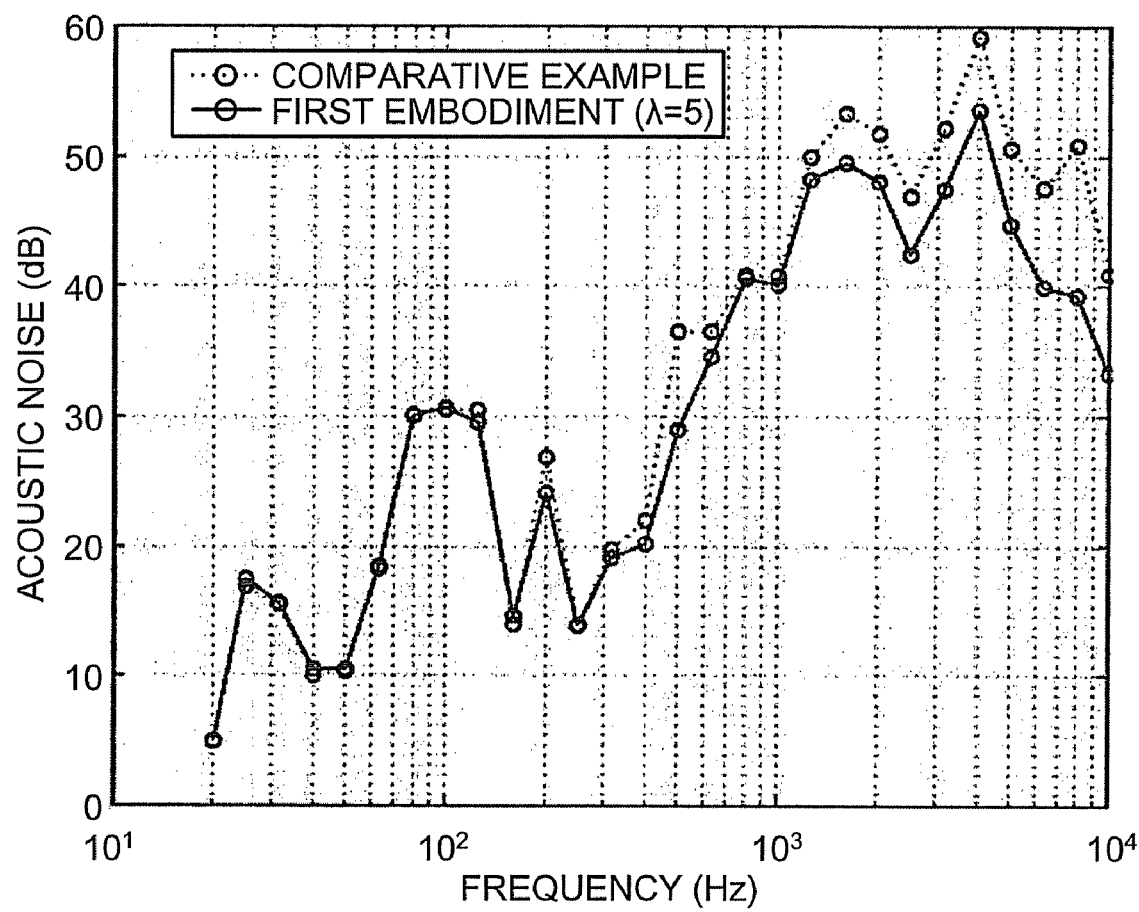
FIG. 24 is a graph of the result of ⅓ octave analysis of noise upon continuous seeking for ⅓ track.

As the result of ⅓ octave analysis of noise upon continuous seeking for ⅓ track, as shown in FIG. 24, it is clear from the ⅓ octave analysis of noise that the noise in the high frequency region can be largely reduced.

Figure 25:
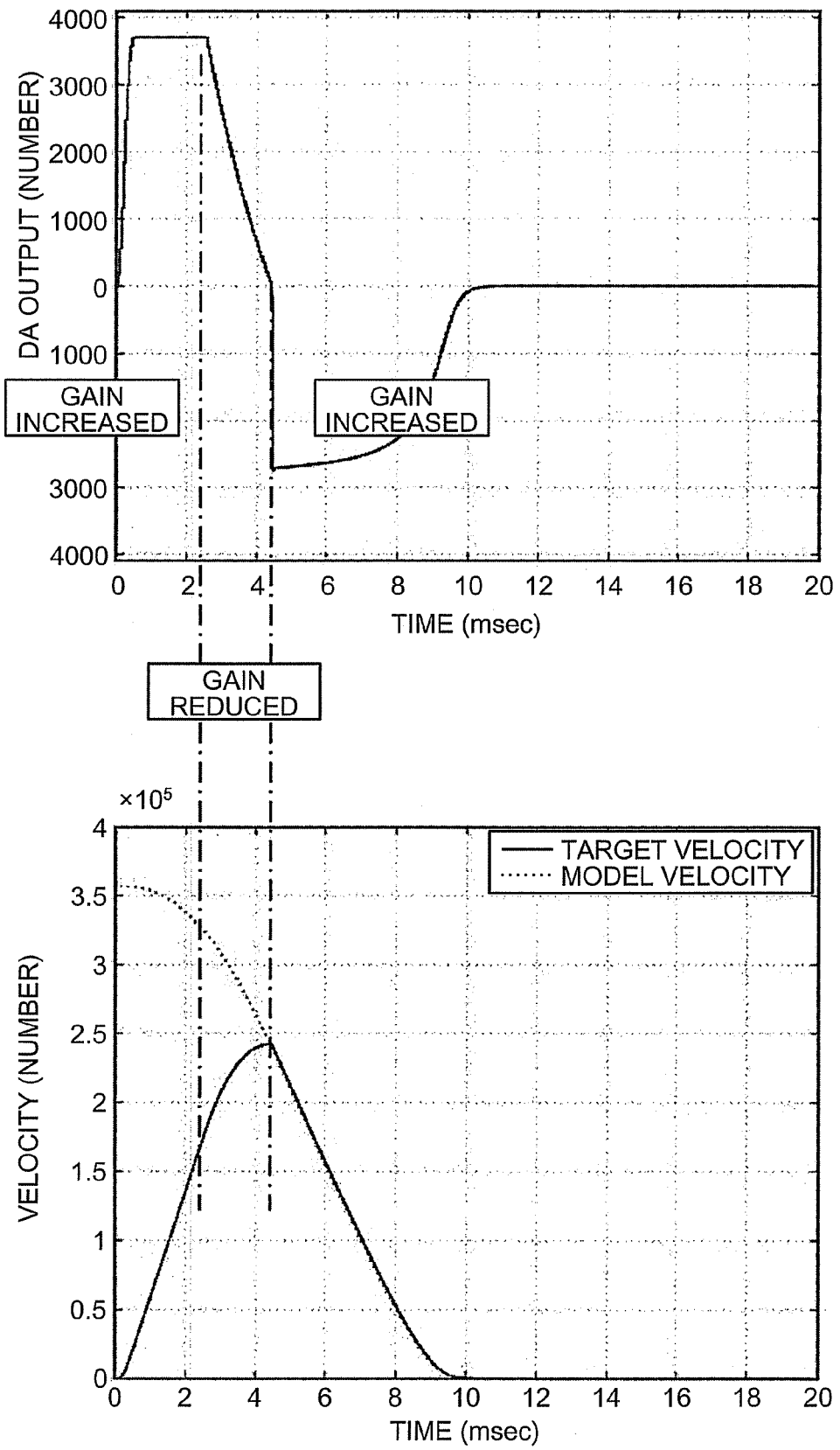
FIG. 25 is a graph of a relationship between gain and model velocity.

In the head-positioning control system according to the comparative example, to smoothly switch from acceleration to deceleration without sacrificing the following capability to the target velocity, a velocity feedback coefficient needs to be changed depending on a velocity error. For example, a method as follows can be considered. The method is such that "The gain is increased to reduce the time for reaching the target velocity when the model velocity is largely apart from the target velocity, while the gain is reduced to more smoothly reach the target velocity when the model velocity is close to the target velocity. Then, the gain is increased to improve the following performance when the velocity error becomes smaller than a fixed value.". The example in this case is shown in FIG. 25. As shown in FIG. 25, by reducing the gain as the model velocity approaches the target velocity curve, the change upon switching to deceleration can be made smoother. Moreover, the following capability to the target velocity is not largely degraded.

However, when the feedback gain is again increased to improve the following capability to the target velocity, the control command abruptly changes, and the mechanical resonance of the actuator is thereby easily excited. To avoid the mechanical resonance by the method according to the comparative example, gain switching needs to be performed many times in a short period of time for changing from acceleration to deceleration. The gain switching in the short period of time causes setting of timing to be made extremely difficult. Furthermore, there are many setting parameters such as a switching time and a feedback gain. Furthermore, because the mode of change from acceleration to deceleration is changed depending on a seek distance, timing of switching to deceleration needs to be changed depending on the seek distance, which causes the control program to be very complicated. The fact above shows that the control of the way to switch from acceleration to deceleration in the method according to the comparative example is extremely difficult.

In the head-positioning control system for the hard disk drive according to the first embodiment, the model-side control system is configured by using the differential value $df(x_1)/dx_1$ of the target velocity with respect to the remaining distance $x_1$, and the feedforward control command u required for the model velocity $x_2$ to follow the target velocity is generated by using the remaining distance $x_1$ corresponding to the target velocity. Thus, the following capability of the model velocity to the target velocity can be improved, and excitation of mechanical resonance can be suppressed by smoothly switching the control command from acceleration to deceleration.

A hard disk drive according to the second embodiment is different from that of the first embodiment in the method of calculating the control command u in the head-positioning control system.

Figure 26:
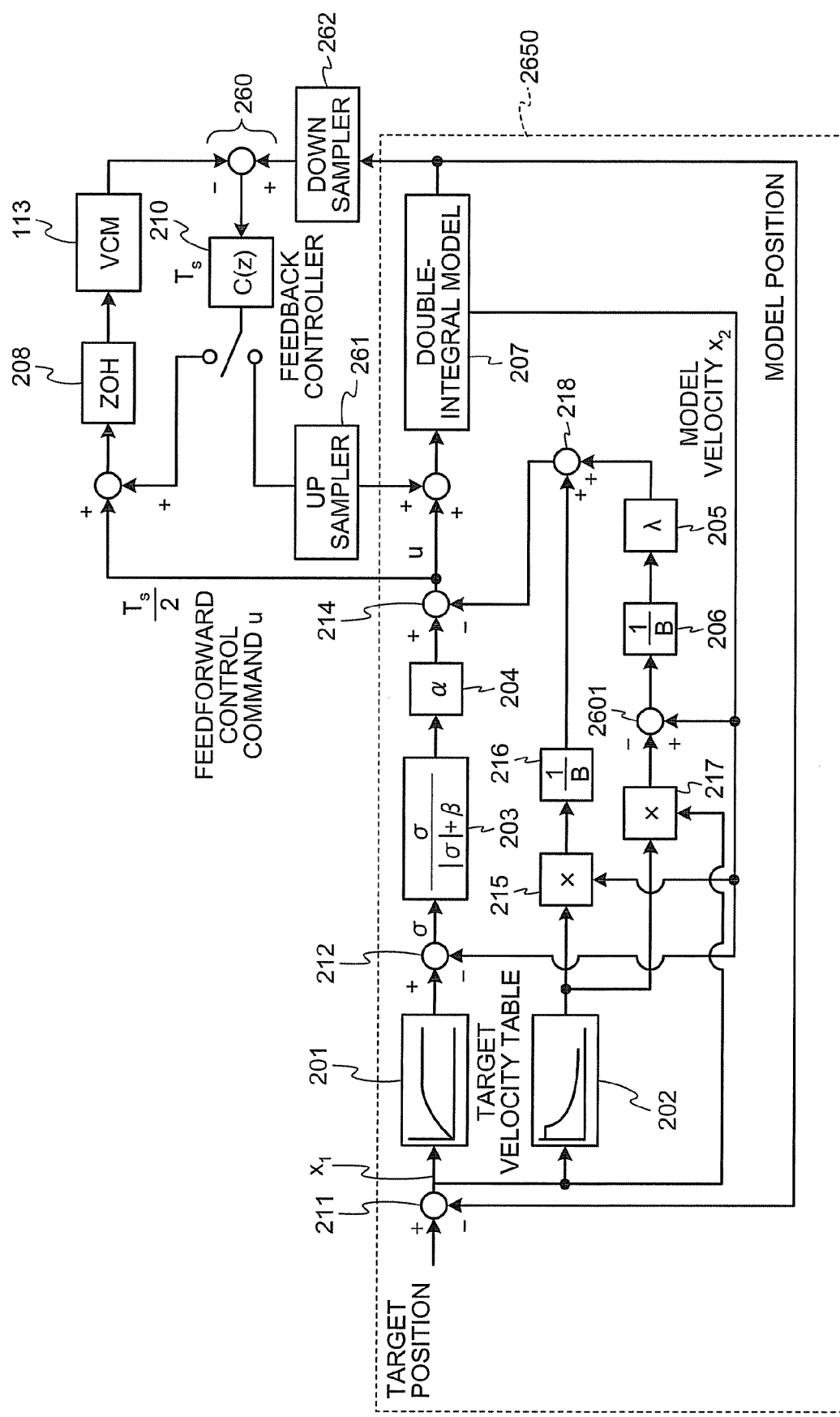
FIG. 26 is a control block diagram of a head-positioning control system according to a second embodiment.

The head-positioning control system according to the second embodiment also has two control loops such as a model-side control system 2650 and the position-error feedback control system (C(z)) 260, as shown in FIG. 26. The position-error feedback control system (C(z)) 260 is the same as that of the first embodiment.

In the second embodiment, the control command u is obtained by Equation (26) instead of Equation (9) for calculating the control command u in the first embodiment.

$$u = -\frac{1}{B} \cdot \frac{df(x_1)}{dx_1} \cdot x_2 + \alpha \frac{\sigma}{|\sigma|+\beta} - \lambda \cdot \frac{1}{B} \cdot \left(x_2 - \frac{df(x_1)}{dx_1} \cdot x_1\right) \quad (26)$$

In other words, the third term in Equation (26) is different from that in Equation (9). Specifically, in the model-side control system 2650, a control command u and a model position are obtained based on a multiplied value obtained by multiplying a differential value $df(x_1)/dx_1$ with a remaining distance $x_1$ of a target velocity $f(x_1)$ corresponding to the remaining distance $x_1$ by a model velocity $x_2$, and also based on a value obtained by multiplying a difference by a gain constant $\lambda$, the difference being between a multiplied value of the differential value $df(x_1)/dx_1$ and the remaining distance $x_1$, and the model velocity $x_2$.

More specifically, as shown in FIG. 26, the multiplier 217 multiplies the differential value $df(x_1)/dx_1$ by the remaining distance $x_1$ to obtain a multiplied value. A difference element 2601 calculates a difference between the multiplied value and the model velocity $x_2$ calculated by the double-integral model 207. Then, the compensation elements 206 and 205 sequentially multiply the difference by 1/B and by gain $\lambda$, respectively. With this calculation, the value of the third term in Equation (26) is output from the compensation element 205. The values of the first term and the second term in Equation (26) are calculated in the same manner as that of the first embodiment.

The values of the first term, the second term, and the third term in Equation (26) calculated in the above manner are added and subtracted in the addition element 218 and the difference element 214 respectively, to obtain the control command u. The control command u is input to the double-integral model 207 and is also provided as a feedforward control command u to the actuator.

In the head-positioning control system for the hard disk drive according to the second embodiment, the model-side control system is configured by using the differential value $df(x_1)/dx_1$ of the target velocity with respect to the remaining distance $x_1$, and the feedforward control command u required for the model velocity $x_2$ to follow the target velocity is generated by using the remaining distance $x_1$ corresponding to the target velocity. Thus, the following capability of the model velocity to the target velocity can be improved, and excitation of mechanical resonance can be suppressed by smoothly switching the control command from acceleration to deceleration.

A hard disk drive according to the third embodiment is different from that of the first and the second embodiments in the method of calculating the control command u in the head-positioning control system.

Figure 27:
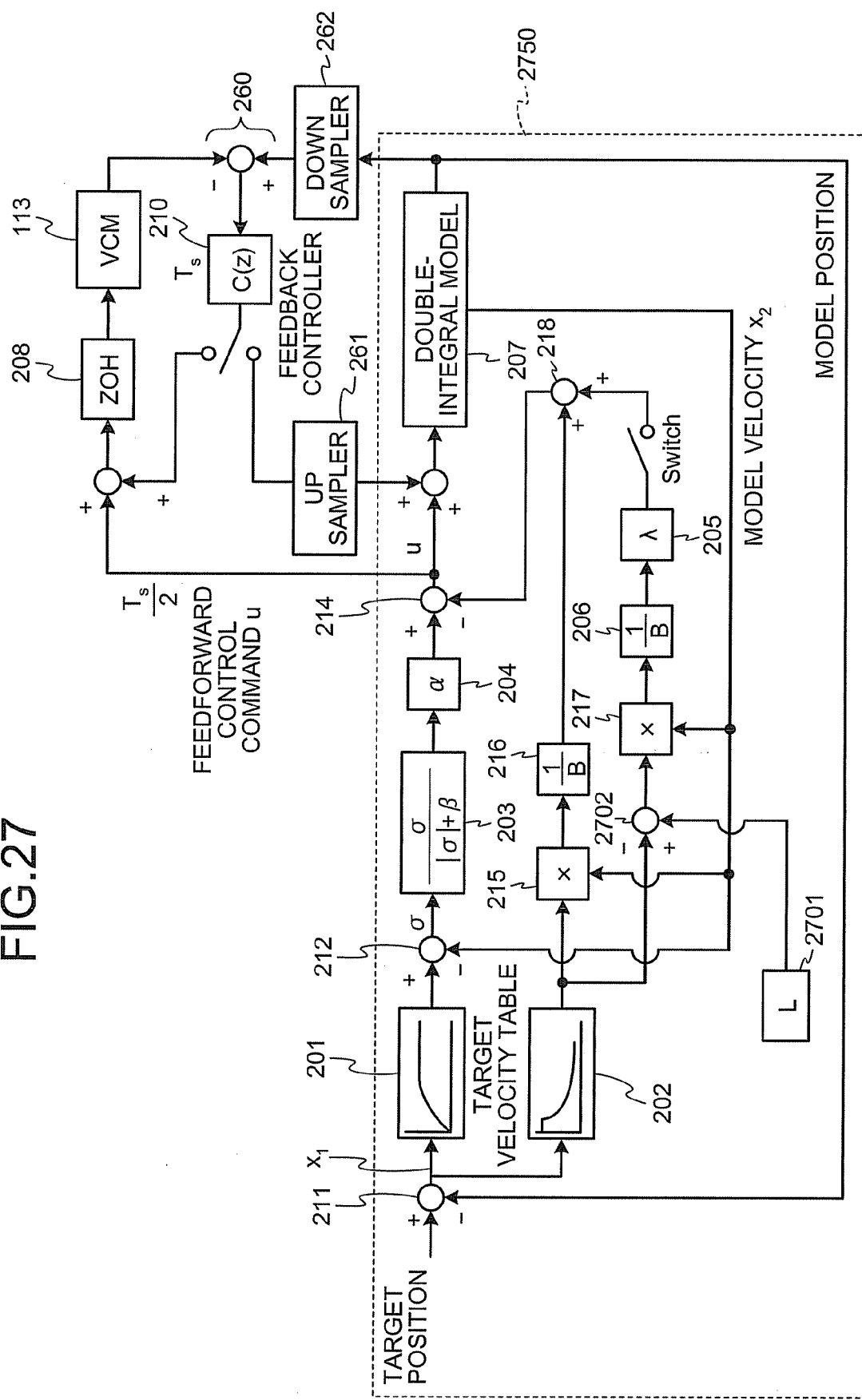
FIG. 27 is a control block diagram of a head-positioning control system according to a third embodiment.

The head-positioning control system according to the third embodiment also has two control loops such as a model-side control system 2750 and the position-error feedback control system (C(z)) 260, as shown in FIG. 27. The position-error feedback control system (C(z)) 260 is the same as that of the first embodiment.

In the third embodiment, the control command u is obtained by Equation (27) instead of Equation (9) for calculating the control command u in the first embodiment.

$$u = \begin{cases} -\frac{1}{B} \cdot \frac{df(x_1)}{dx_1} \cdot x_2 + \alpha \frac{\sigma}{|\sigma|+\beta} - \\ \quad \lambda \cdot \frac{1}{B} \cdot \left(L - \frac{df(x_1)}{dx_1}\right) \cdot x_2 & \frac{df(x_1)}{dx_1} < L \\ -\frac{1}{B} \cdot \frac{df(x_1)}{dx_1} \cdot x_2 + \alpha \frac{\sigma}{|\sigma|+\beta} & \frac{df(x_1)}{dx_1} \geq L \end{cases} \quad (27)$$

In other words, the third term in Equation (27) is different from that in Equation (9) and Equation (26). Specifically, in the model-side control system 2750, if a differential value $df(x_1)/dx_1$ with a remaining distance $x_1$ of a target velocity $f(x_1)$ corresponding to the remaining distance $x_1$ is smaller than a predetermined threshold L, a control command u and a model position are obtained based on a multiplied value of the differential value $df(x_1)/dx_1$ and a model velocity $x_2$, and also based on a value obtained by multiplying a difference between the differential value $df(x_1)/dx_1$ and the threshold L, by the model velocity $x_2$ and by the gain constant $\lambda$ respectively.

More specifically, as shown in FIG. 27, a difference element 2702 calculates a difference between the threshold L (that is held at threshold holding unit 2701) and the differential value $df(x_1)/dx_1$, and the multiplier 217 multiplies the difference by the model velocity $x_2$ calculated by the double-integral model 207 to obtain a value multiplied. The value multiplied is sequentially multiplied by 1/B in the compensation element 206 and by gain $\lambda$ in the compensation element 205. If the differential value $df(x_1)/dx_1$ is smaller than the threshold L, the switch is turned on, and the value is output as the third term in Equation (27) from the compensation element 205. On the other hand, if the differential value $df(x_1)/dx_1$ is greater than the threshold L, the switch is turned off, and no value is output from the compensation element 205. If it is equal to the threshold L, the switch is turned on or off.

The values of the first term, the second term, and the third term in Equation (27) calculated in the above manner are added and subtracted in the addition element 218 and the difference element 214 respectively, to obtain the control command u. The control command u is input to the double-integral model 207 and is also provided as a feedforward control command u to the actuator.

In the head-positioning control system for the hard disk-drive according to the third embodiment, the model-side control system is configured by using the differential value $df(x_1)/dx_1$ of the target velocity with respect to the remaining distance $x_1$, and the feedforward control command u required for the model velocity $x_2$ to follow the target velocity is generated by using the remaining distance $x_1$ corresponding to the target velocity. Thus, the following capability of the model velocity to the target velocity can be improved, and excitation of mechanical resonance can be suppressed by smoothly switching the control command from acceleration to deceleration.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A magnetic disk device comprising: a magnetic disk on which data is recorded;
    a head that performs recording and reproducing data with respect to the magnetic disk;
    a head driver that moves the head in a radial direction of the magnetic disk; and
    a positioning controller that issues a control command to the head driver to control the head to be located at a target position on the magnetic disk, wherein the positioning controller includes a feedback controller that performs a feedback control based on an error between the target position and an actual position of the head; and
    a model controller that obtains the control command, a model position to be output as a command for the target position to the feedback controller, and a model velocity for the head to follow a target velocity, by using a preset control equation model, and obtains the control command and the model position with the target position as an input, based on a differential value of the target velocity corresponding to a remaining distance from the model position to the target position, wherein
    the model controller obtains the control command and the model position based on a value obtained by multiplying the differential value by the model velocity.

2. The magnetic disk device according to claim 1, wherein the model controller obtains the control command and the model position based on an error between the model velocity and the target velocity.

3. The magnetic disk device according to claim 1, wherein the model controller obtains the control command and the model position based on a value obtained by multiplying the differential value by the remaining distance to the target position.

4. The magnetic disk device according to claim 1, wherein the model controller obtains the control command and the model position based on a value obtained by multiplying the differential value by the remaining distance to the target position and a gain constant.

5. The magnetic disk device according to claim 4, wherein the model controller controls the gain constant in a changeable manner.

6. The magnetic disk device according to claim 1, wherein the model controller obtains the control command and the model position based on a value obtained by multiplying a difference between a value obtained by multiplying the differential value by the remaining distance to the target position and the model velocity by a gain constant.

7. The magnetic disk device according to claim 1, wherein when the differential value is smaller than a predetermined threshold, the model controller obtains the control command and the model position based on a value obtained by multiplying the differential value by the model velocity, an error between the model velocity and the target velocity, and a value obtained by multiplying a difference between the differential value and the threshold by the model velocity and a gain constant.

8. The magnetic disk device according to claim 1, wherein when the differential value is greater than a predetermined threshold, the model controller obtains the control command and the model position based on a value obtained by multiplying the differential value by the model velocity, and an error between the model velocity and the target velocity.

9. The magnetic disk device according to claim 1 further comprising:
    a storage unit that stores therein a differential-value table in which the remaining distance is associated with the differential value of the target velocity, wherein the model controller calculates the remaining distance from the target position and the model position, obtains a differential value of the target velocity corresponding to calculated remaining distance from the differential-value table, and obtains the control command and the model position based on obtained differential value.

10. The magnetic disk device according to claim 1, further comprising:
    a storage unit that stores a target-velocity-curve table in which the remaining distance is associated with the target velocity, wherein the model controller obtains the target velocity from a difference between the target position and the model position from the target-velocity-curve table, and obtains the control command and the model position based on the differential value of the target velocity corresponding to the remaining distance.

11. The magnetic disk device according to claim 1, wherein the model controller further includes a double-integral processor that generates the model position and the model velocity.

12. A method of controlling a head position on a magnetic disk, the method comprising:
    controlling a head that performs recording and reproducing data with respect to the magnetic disk to be located at a target position on the magnetic disk by performing a feedback control based on an error between the target position and an actual position of the head; and
    obtaining, when obtaining a control command issued to a head driver that moves the head in a radial direction of the magnetic disk, a model position to be output as a command for the target position for the feedback control, and a model velocity for the head to follow a target velocity, by using a preset control equation model, the control command and the model position with the target position as an input, based on a differential value of the target velocity corresponding to a remaining distance from the model position to the target position, wherein
    the obtaining includes obtaining the control command and the model position based on a value obtained by multiplying the differential value by the model velocity.

* * * * *